(12) United States Patent
Kakebe

(10) Patent No.: US 12,395,064 B2
(45) Date of Patent: Aug. 19, 2025

(54) SEMICONDUCTOR MODULE

(71) Applicant: FUJI ELECTRIC CO., LTD., Kawasaki (JP)

(72) Inventor: Isao Kakebe, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 58 days.

(21) Appl. No.: 18/236,984

(22) Filed: Aug. 23, 2023

(65) Prior Publication Data

US 2024/0097556 A1 Mar. 21, 2024

(30) Foreign Application Priority Data

Sep. 16, 2022 (JP) ................. 2022-147659

(51) Int. Cl.
| H02M 1/08 | (2006.01) |
| H02M 1/00 | (2006.01) |
| H02M 1/088 | (2006.01) |
| H02M 1/32 | (2007.01) |
| H02M 7/5387 | (2007.01) |

(52) U.S. Cl.
CPC ......... *H02M 1/088* (2013.01); *H02M 1/0009* (2021.05); *H02M 1/0019* (2021.05); *H02M 1/0025* (2021.05); *H02M 1/32* (2013.01); *H02M 7/53875* (2013.01)

(58) Field of Classification Search
CPC ............. H02M 1/0009; H02M 1/0019; H02M 1/0025; H02M 1/0054; H02M 1/08; H02M 1/088; H02M 1/32; H02M 7/5387; H02M 7/53871; H02M 7/53875
See application file for complete search history.

(56) References Cited

U.S. PATENT DOCUMENTS

| 10,122,358 | B1 | 11/2018 | Shiraishi | |
| 2010/0253306 | A1* | 10/2010 | Shiraishi | ............ H03K 17/6871 323/282 |
| 2011/0298446 | A1* | 12/2011 | Shiraki | ................. H01L 23/585 257/E29.166 |
| 2012/0236617 | A1* | 9/2012 | Hamanaka | ........ H02M 7/53873 363/132 |
| 2018/0062533 | A1* | 3/2018 | Maruyama | ............ H02M 1/088 |
| 2018/0309441 | A1 | 10/2018 | Shiraishi | |
| 2019/0097563 | A1* | 3/2019 | Shimomugi | ............ F25B 31/02 |

FOREIGN PATENT DOCUMENTS

| JP | 2010-62860 A | 3/2010 |
| JP | 2018-186600 A | 11/2018 |
| JP | 2020-18055 A | 1/2020 |

* cited by examiner

*Primary Examiner* — Levi Gannon

(57) ABSTRACT

An object of the present disclosure is to provide a semiconductor module capable of reducing variation in drive characteristics of each of plural semiconductor switching elements. A semiconductor module includes IGBTs configured to supply power to a load and gate driver circuits in which drive targets are set in a one-to-one relationship to the IGBTs and in which according to a positional relationship to, for example, the IGBT as the drive target, a driving capability of the gate driver circuit to drive the IGBT is set.

8 Claims, 9 Drawing Sheets

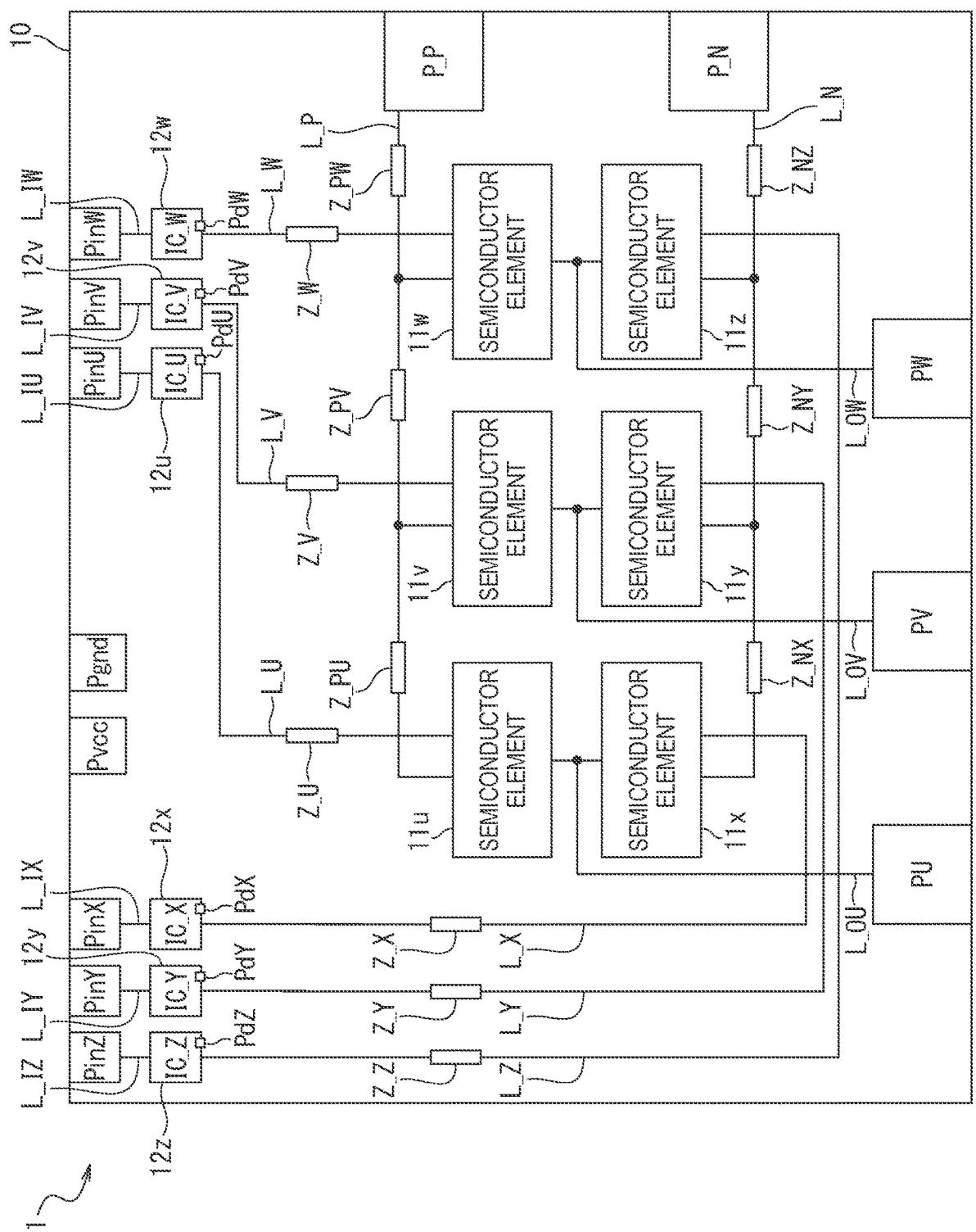
F I G. 2

SEMICONDUCTOR MODULE

CROSS REFERENCE TO RELATED APPLICATIONS AND INCORPORATION BY REFERENCE

This application claims benefit of priority under 35 USC 119 based on Japanese Patent Application No. 2022-147659 filed on Sep. 16, 2022, the entire contents of which are incorporated by reference herein.

TECHNICAL FIELD

The present disclosure relates to semiconductor modules including a plurality of semiconductor switching elements.

BACKGROUND ART

Driver integrated circuits (ICs) that control semiconductor switching elements such as insulated gate bipolar transistors (IGBTs) for power conversion have a basic function to control an ON and OFF state of the semiconductor switching elements in response to input signals. Intelligent power modules (IPMs), a type of semiconductor module, are used with semiconductor switching elements and driver ICs incorporated therein.

When driving each semiconductor switching element from an OFF state to an ON state, the driver IC charges the semiconductor switching element with a constant current circuit, and when driving it from the ON state to the OFF state, electric charge stored in the semiconductor switching element is removed by switch provided in the driver IC. IPMs can be provided with a function that allows the driver ICs to monitor current flowing through the semiconductor switching elements and activates a protective action for suppressing current flowing through the semiconductor switching elements if overcurrent flows therethrough.

PTL 1 (JP 2010-62860 A) discloses a technology that detects overcurrent in switching elements and performs a protective action. PTL 2 (JP 2020-18055 A) discloses a technology that suppresses current bias by equalizing impedance of each wiring path when driving a plurality of switches connected in parallel. PTL 3 (JP 2018-186600 A) discloses a technology that improves the accuracy of detection of short circuit current by providing a difference in wiring inductance between a main electrode and a sense electrode of a transistor to reduce a difference in gate drive voltage between the main electrode and the sense electrode.

SUMMARY OF INVENTION

Technical Problem

Power supply impedance of each component varies depending on arrangement of the plurality of semiconductor switching elements and arrangement of the plurality of driver ICs provided in IPMs. Additionally, impedance of wiring through which a drive signal and an overcurrent detection signal are transmitted also varies depending on a positional relationship between the driver ICs and the semiconductor switching elements. This causes variation in characteristics of the plurality of driver ICs driving the semiconductor switching elements. Then, the characteristic variation create negative effects such as increased power loss and differences in characteristics of the overcurrent protection function among the plurality of driver ICs.

It is an object of the present disclosure to provide a semiconductor module capable of reducing variation in drive characteristics of each of a plurality of semiconductor switching elements.

Solution to Problem

In order to achieve the above-described object, according to an aspect of the present disclosure, there is provided a semiconductor module including: a plurality of semiconductor switching elements configured to supply power to a load; and a plurality of driver circuits in which drive targets are set in a one-to-one relationship to the plurality of semiconductor switching elements and in which according to a positional relationship to each of target switching elements that are the semiconductor switching elements as the drive targets, a driving capability to drive the each target switching element is set.

Advantageous Effects of Invention

According to the one aspect of the present disclosure, variation in drive characteristics of each of the plurality of semiconductor switching elements can be reduced.

BRIEF DESCRIPTION OF DRAWINGS

FIG. 2 is a diagram schematically illustrating a component layout illustrating one example of a schematic configuration of the semiconductor module according to the one embodiment of the present disclosure;

DESCRIPTION OF EMBODIMENTS

Embodiments of the present disclosure exemplify devices and methods for embodying the technological concept of the present disclosure, and the technological concept of the present disclosure does not specify materials, shapes, structures, arrangements, and the like of components to those described below. The technological concept of the present disclosure can be modified in various ways within the technological scope defined by the appended claims.

Semiconductor modules according to embodiments of the present disclosure are described hereinbelow by way of example applied to an inverter device. However, an intelligent power module according to each embodiment is not limited to an inverter device, and can also be applied to a converter device, a modular multilevel conversion device, or the like.

Figure 1:
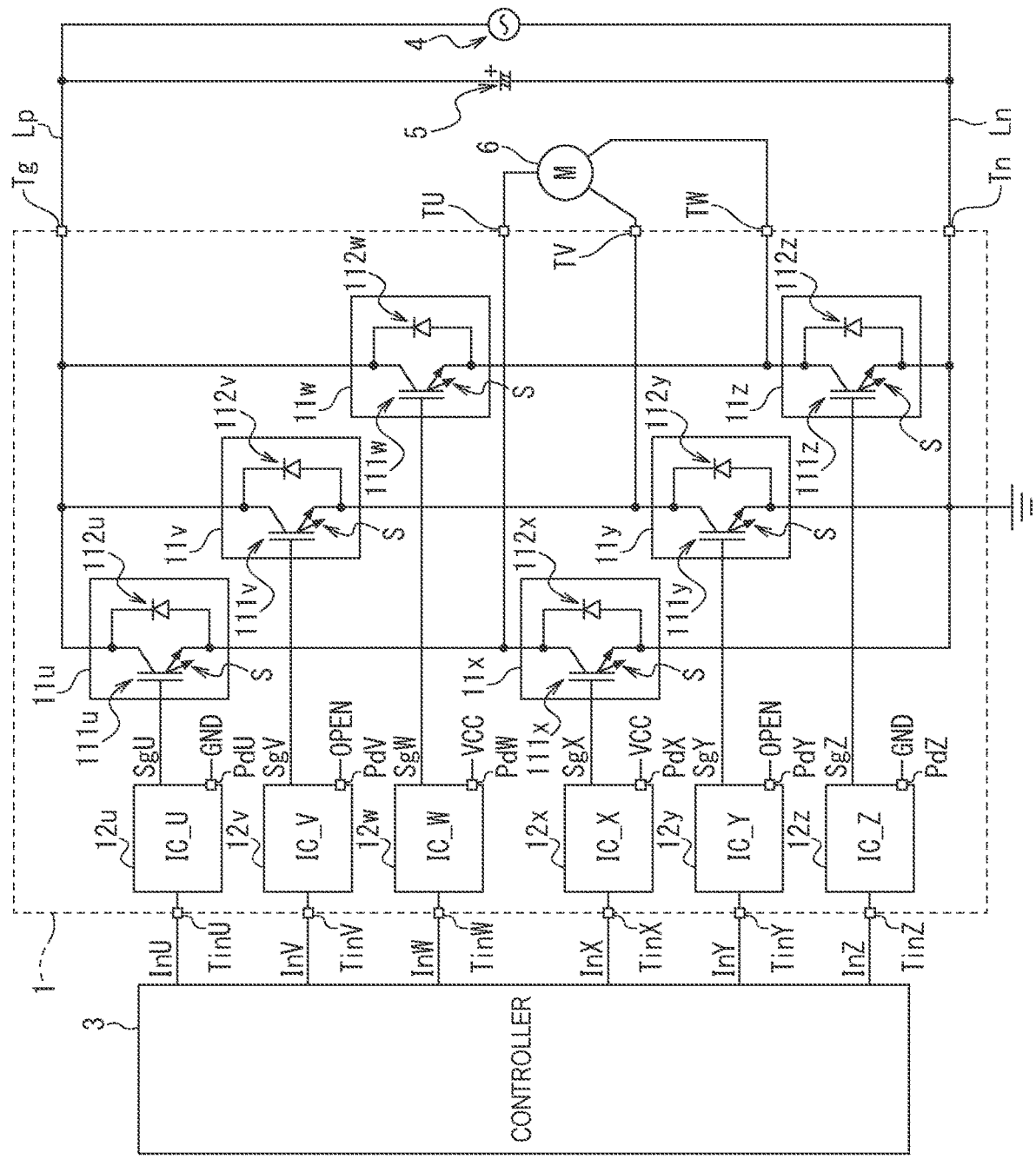
FIG. 1 is a block diagram illustrating one example of a schematic configuration of a semiconductor module according to one embodiment of the present disclosure.

A semiconductor module according to one embodiment of the present disclosure is described using FIGS. 1 to 9. First, one example of an entire configuration of a semiconductor module 1 according to the present embodiment is described using FIGS. 1 and 2. FIG. 1 is a block diagram illustrating one example of a schematic configuration of the semiconductor module 1 according to the present embodiment. In FIG. 1, a controller 3, an AC power supply unit 4, and a smoothing capacitor 5 connected to the semiconductor module 1 are illustrated together for ease of understanding.

(Entire Configuration of Semiconductor Module)

As illustrated in FIG. 1, the semiconductor module 1 according to the present embodiment is connected to the AC power supply unit 4. The AC power supply unit 4 includes, for example, a three phase AC power supply (not illustrated) and a rectifier circuit (not illustrated) that full-wave rectifies three phase AC power input from the three phase AC power supply. The semiconductor module 1 is connected to the smoothing capacitor 5 that smooths the power rectified by the rectifier circuit. Although illustration is omitted, the rectifier circuit is composed of, for example, six diodes connected in a full bridge configuration or six switching elements connected in a full bridge configuration.

A positive-side line Lp is connected to a positive side of the AC power supply unit 4 (i.e., a positive output terminal of the rectifier circuit), and a negative-side line Ln is connected to a negative side of the AC power supply unit 4 (i.e., a negative output terminal of the rectifier circuit). The smoothing capacitor 5 is connected between the positive-side line Lp and the negative-side line Ln. The semiconductor module 1 is composed of an intelligent power module functioning as an inverter device that converts a DC voltage applied between the positive-side line Lp and the negative-side line Ln to a three-phase (U-phase, V-phase, and W-phase) AC voltage. The controller 3 that controls the semiconductor module 1 is connected to the semiconductor module 1. The semiconductor module 1 and the controller 3 form a power conversion device.

As illustrated in FIG. 1, the semiconductor module 1 includes a positive power supply input terminal Tp connected to the positive-side line Lp and a negative power supply input terminal Tn connected to the negative-side line Ln. The semiconductor module 1 includes a semiconductor element 11u and a semiconductor element 11x connected in series between the positive power supply input terminal Tp and the negative power supply input terminal Tn. The semiconductor module 1 includes a semiconductor element 11v and a semiconductor element 11y connected in series between the positive power supply input terminal Tp and the negative power supply input terminal Tn. The semiconductor module 1 includes a semiconductor element 11w and a semiconductor element 11z connected in series between the positive power supply input terminal Tp and the negative power supply input terminal Tn.

The semiconductor element 11u and the semiconductor element 11x form U-phase output arms. The semiconductor element 11v and the semiconductor element 11y form V-phase output arms. The semiconductor element 11w and the semiconductor element 11z form W-phase output arms. The semiconductor elements 11u, 11v, and 11w are connected to the positive-side line Lp via the positive power supply input terminal Tp to form upper arms. The semiconductor elements 11x, 11y, and 11z are connected to the negative-side line Ln via the negative power supply input terminal Tn to form lower arms.

The semiconductor element 11u includes an IGBT 111u and a reflux diode 112u connected in inverse parallel to the IGBT 111u. In the present embodiment, the IGBT 111u and the reflux diode 112u are formed on, for example, the same semiconductor chip, but may be formed on different semiconductor chips from each other. The semiconductor element 11v includes an IGBT 111v and a reflux diode 112v connected in inverse parallel to the IGBT 111v. In the present embodiment, the IGBT 111v and the reflux diode 112v are formed on, for example, the same semiconductor chip, but may be formed on different semiconductor chips from each other. The semiconductor element 11w includes an IGBT 111w and a reflux diode 112w connected in inverse parallel to the IGBT 111w. In the present embodiment, the IGBT 111w and the reflux diode 112w are formed on, for example, the same semiconductor chip, but may be formed on different semiconductor chips from each other.

A collector of each of the IGBTs 111u, 111v, and 111w and a cathode of each of the reflux diodes 112u, 112v, and 112w are connected to each other, respectively, and connected to the positive power supply input terminal Tp. An emitter of each of the IGBTs 111u, 111v, and 111w and an anode of each of the reflux diodes 112u, 112v, and 112w are connected to each other, respectively. Each of the IGBTs 111u, 111v, and 111w includes a current detection element S (see below for details) for detecting current flowing through itself (i.e., the IGBT 111u, 111v, 111w).

The semiconductor element 11x includes an IGBT 111x and a reflux diode 112x connected in inverse parallel to the IGBT 111x. In the present embodiment, the IGBT 111x and the reflux diode 112x are formed on, for example, the same semiconductor chip, but may be formed on different semiconductor chips from each other. The semiconductor element 11y includes an IGBT lily and a reflux diode 112y connected in inverse parallel to the IGBT 111y. In the present embodiment, the IGBT lily and the reflux diode 112y are formed on, for example, the same semiconductor chip, but may be formed on different semiconductor chips from each other. The semiconductor element 11z includes an IGBT 111z and a reflux diode 112z connected in inverse parallel to the IGBT 111z. In the present embodiment, the IGBT 111z and the reflux diode 112z are formed on, for example, the same semiconductor chip, but may be formed on different semiconductor chips from each other.

A collector of the IGBT 111x and a cathode of the reflux diode 112x are connected to each other. The collector of the IGBT 111x and the cathode of the reflux diode 112x are connected to the emitter of the IGBT 111u and the anode of the reflux diode 112u. A collector of the IGBT lily and a cathode of the reflux diode 112y are connected to the emitter of the IGBT 111v and the anode of the reflux diode 112v. A collector of the IGBT 111z and a cathode of the reflux diode 112z are connected to the emitter of the IGBT 111w and the anode of the reflux diode 112w. Emitters of each of the IGBTs 111x, 111y, and 111z and anodes of each of the reflux diodes 112x, 112y, and 112z are connected to each other, respectively and connected to the negative power supply input terminal Tn. Each of the IGBTs 111x, 111y, and 111z includes a current detection element S (see below for details) for detecting current flowing through itself (i.e., the IGBT 111x, 111y, 111z).

The emitter of the IGBT 111u, the anode of the reflux diode 112u, the collector of the IGBT 111x, and the cathode of the reflux diode 112x are connected to a U-phase output terminal TU. The U-phase output terminal TU is a terminal from which the semiconductor module 1 outputs a U-phase AC voltage generated by DC to AC conversion of a DC voltage input from the AC power supply unit 4.

The emitter of the IGBT 111v, the anode of the reflux diode 112v, the collector of the IGBT 111y, and the cathode of the reflux diode 112y are connected to a V-phase output terminal TV. The V-phase output terminal TV is a terminal from which the semiconductor module 1 outputs a V-phase AC voltage generated by DC to AC conversion of a DC voltage input from the AC power supply unit 4.

The emitter of the IGBT 111w, the anode of the reflux diode 112w, the collector of the IGBT 111z, and the cathode of the reflux diode 112z are connected to a W-phase output terminal TW. The W-phase output terminal TW is a terminal from which the semiconductor module 1 outputs a W-phase AC voltage generated by DC to AC conversion of a DC voltage input from the AC power supply unit 4.

As illustrated in FIG. 1, a load, for example, a motor 6 is connected to the U-phase output terminal TU, the V-phase output terminal TV, and the W-phase output terminal TW provided in the semiconductor module 1. Accordingly, the emitters of the IGBTs 111u, 111v, and 111w and the anodes of the reflux diodes 112u, 112v, and 112w provided in the semiconductor elements 11u, 11v, and 11w and the collectors of the IGBTs 111x, 111y, and 111z and the cathodes of the reflux diodes 112x, 112y, and 112z provided in the semiconductor elements 11x, 11y, and 11z are connected to the motor 6.

Thus, the semiconductor module 1 includes the plurality of IGBTs (one example of semiconductor switching elements) 111u, 111v, 111w, 111x, 111y, and 111z that supply power to the motor (one example of a load) 6. In the present embodiment, the semiconductor module 1 includes the IGBTs as semiconductor switching elements, but may include other types of power semiconductor elements, such as metal-oxide-semiconductor field-effect transistors (MOSFETs).

As illustrated in FIG. 1, the semiconductor module 1 includes a plurality of gate driver circuits (one example of driver circuits) 12u, 12v, 12w, 12x, 12y, and 12z in which drive targets are set in a one-to-one relationship to the IGBTs 111u, 111v, 111w, 111x, 111y, and 111z and in which according to a positional relationship to target switching elements that are the IGBTs 111u, 111v, 111w, 111x, 111y, and 111z set as the drive targets, a driving capability is set to drive the target switching elements. In the present embodiment, for the gate driver circuit 12u, the IGBT 111u is set as the drive target in the one-to-one relationship. Accordingly, the IGBT 111u corresponds to a target switching element for the gate driver circuit 12u. In the present embodiment, for the gate driver circuit 12v, the IGBT 111v is set as the drive target in the one-to-one relationship. Accordingly, the IGBT 111v corresponds to a target switching element for the gate driver circuit 12v. In the present embodiment, for the gate driver circuit 12w, the IGBT 111w is set as the drive target in the one-to-one relationship. Accordingly, the IGBT 111w corresponds to a target switching element for the gate driver circuit 12w. In the present embodiment, for the gate driver circuit 12x, the IGBT 111x is set as the drive target in the one-to-one relationship. Accordingly, the IGBT 111x corresponds to a target switching element for the gate driver circuit 12x. In the present embodiment, for the gate driver circuit 12y, the IGBT 111y is set as the drive target in the one-to-one relationship. Accordingly, the IGBT 111y corresponds to a target switching element for the gate driver circuit 12y. In the present embodiment, for the gate driver circuit 12z, the IGBT 111z is set as the drive target in the one-to-one relationship. Accordingly, the IGBT 111z corresponds to a target switching element for the gate driver circuit 12z.

Although details are described later, the gate driver circuits 12u, 12v, 12w, 12x, 12y, and 12z are provided with determination pads Pdu, Pdv, Pdw, Pdx, Pdy, and Pdz whose voltage levels are changed according to positional relationships of the gate driver circuits 12u, 12v, 12w, 12x, 12y, and 12z to the IGBTs 111u, 111v, 111w, 111x, 111y, and 111z. In the present embodiment, the determination pad Pdu provided in the gate driver circuit 12u is connected to a reference potential terminal (e.g., a ground terminal) set to reference potential. The determination pad Pdv provided in the gate driver circuit 12v is set to an OPEN state. The determination pad Pdw provided in the gate driver circuit 12w is connected to a power supply terminal from which power supply voltage VCC is output. Additionally, the determination pad Pdx provided in the gate driver circuit 12x is connected to a power supply terminal from which power supply voltage VCC is output. The determination pad Pdy provided in the gate driver circuit 12y is set to an OPEN state. The determination pad Pdz provided in the gate driver circuit 12z is connected to a reference potential terminal (e.g., a ground terminal) set to reference potential.

As illustrated in FIG. 1, the gate driver circuit 12u is connected to a signal input terminal TinU provided in the semiconductor module 1. The signal input terminal TinU is connected to the controller 3. This allows an input signal InU output from the controller 3 to be input to the gate driver circuit 12u via the signal input terminal TinU. The gate driver circuit 12u generates a gate drive signal SgU to drive the IGBT 111u using the input signal InU.

The gate driver circuit 12v is connected to a signal input terminal TinV provided in the semiconductor module 1. The signal input terminal TinV is connected to the controller 3. This allows an input signal InV output from the controller 3 to be input to the gate driver circuit 12v via the signal input terminal TinV. The gate driver circuit 12v generates a gate drive signal SgV to drive the IGBT 111v using the input signal InV.

The gate driver circuit 12w is connected to a signal input terminal TinW provided in the semiconductor module 1. The signal input terminal TinW is connected to the controller 3. This allows an input signal InW output from the controller 3 to be input to the gate driver circuit 12w via the signal input terminal TinW. The gate driver circuit 12w generates a gate drive signal SgW to drive the IGBT 111w using the input signal InW.

The gate driver circuit 12x is connected to a signal input terminal TinX provided in the semiconductor module 1. The signal input terminal TinX is connected to the controller 3. This allows an input signal InX output from the controller 3 to be input to the gate driver circuit 12x via the signal input terminal TinX. The gate driver circuit 12x generates a gate drive signal SgX to drive the IGBT 111x using the input signal InX.

The gate driver circuit 12y is connected to a signal input terminal TinY provided in the semiconductor module 1. The signal input terminal TinY is connected to the controller 3. This allows an input signal InY output from the controller 3 to be input to the gate driver circuit 12$y$ via the signal input terminal TinY. The gate driver circuit 12$y$ generates a gate drive signal SgY to drive the IGBT 111$y$ using the input signal InY.

The gate driver circuit 12$z$ is connected to a signal input terminal TinZ provided in the semiconductor module 1. The signal input terminal TinZ is connected to the controller 3. This allows an input signal InZ output from the controller 3 to be input to the gate driver circuit 12$z$ via the signal input terminal TinZ. The gate driver circuit 12$z$ generates a gate drive signal SgZ to drive the IGBT 111$z$ using the input signal InZ.

Next, a layout for components such as the gate driver circuit 12$u$ included in the semiconductor module 1 is described with reference to FIG. 1 and using FIG. 2. FIG. 2 is a diagram schematically illustrating a component layout illustrating one example of a schematic configuration of the semiconductor module 1. In FIG. 2, for ease of understanding, impedance of wiring connecting between each component is represented by a circuit symbol of a resistance element. Additionally, in FIG. 2, the gate driver circuit 12$u$ is denoted as "IC_U", the gate driver circuit 12$v$ as "IC_V", the gate driver circuit 12$w$ as "IC_W", the gate driver circuit 12$x$ as "IC_X", the gate driver circuit 12$y$ as "IC_Y", and the gate driver circuit 12$z$ as "IC_Z".

As illustrated in FIG. 2, in the semiconductor module 1, the gate driver circuit 12$u$, the semiconductor element 11$u$, and the like are integrated and formed at predetermined locations, for example, on a square-shaped semiconductor substrate 10. On one of four peripheral edges of the semiconductor substrate 10 are arranged signal input pads PinU, PinV, PinW, PinX, PinY, PinZ. The signal input pad PinU is connected to the signal input terminal TinU (see FIG. 1). The signal input pad PinV is connected to the signal input terminal TinV (see FIG. 1). The signal input pad PinW is connected to the signal input terminal TinW (see FIG. 1). The signal input pad PinX is connected to the signal input terminal TinX (see FIG. 1). The signal input pad PinY is connected to the signal input terminal TinY (see FIG. 1). The signal input pad PinZ is connected to the signal input terminal TinZ (see FIG. 1).

Between the signal input pad PinX and the signal input pad PinU are arranged a power supply pad Pvcc connected to a power supply terminal from which the power supply voltage VCC is output and a reference potential pad Pgnd connected to a reference potential terminal set to reference potential.

Among the four peripheral edges of the semiconductor substrate 10, an outer edge parallel to an outer peripheral edge arranged with the signal input pad PinU and the like is arranged with a U-phase output pad P_U, a V-phase output pad P_V, and a W-phase output pad P_W. The U-phase output pad P_U is a pad from which a U-phase AC voltage is output, and is connected to the U phase output terminal TU (see FIG. 1). The V-phase output pad P_V is a pad from which a V-phase AC voltage is output, and is connected to the V-phase output terminal TV (see FIG. 1). The W-phase output pad P_W is a pad from which a W-phase AC voltage is output, and is connected to the W-phase output terminal TW (see FIG. 1).

Among the four peripheral edges of the semiconductor substrate 10, a peripheral edge orthogonal to the peripheral edge arranged with the signal input pad PinU and the like and the peripheral edge arranged with the U-phase output pad P_U and the like is arranged with a positive power supply input pad P_P connected to the positive power supply input terminal Tp (see FIG. 1) and a negative power supply input pad P_N connected to the negative power supply input terminal Tn (see FIG. 1). Therefore, a positive DC voltage output from the AC power supply unit 4 (see FIG. 1) is input to the positive power supply input pad P_P, and a negative DC voltage output from the AC power supply unit 4 is input to the negative power supply input pad P_N.

The semiconductor elements 11$u$, 11$v$, 11$w$, 11$x$, 11$y$, and 11$z$ are arranged substantially in the center of the semiconductor substrate 10. The semiconductor elements 11$u$, 11$v$, and 11$w$ and the semiconductor elements 11$x$, 11$y$, and 11$z$ are arranged side by side in a direction of extension of the peripheral edge arranged with the positive power supply input pad P_P and the negative power supply input pad P_N. The semiconductor elements 11$u$, 11$v$, and 11$w$ are arranged side by side in a direction of extension of the peripheral edge arranged with the signal input pad PinU and the like. The semiconductor elements 11$x$, 11$y$, and 11$z$ are arranged side by side in the direction of extension of the peripheral edge arranged with the signal input pad PinU and the like.

A wiring pattern L_P connected to the positive power supply input pad P_P is formed on the semiconductor substrate 10. The semiconductor elements 11$u$, 11$v$, and 11$w$ are connected to the wiring pattern L_P, and the semiconductor elements 11$x$, 11$y$, and 11$z$ are connected to the wiring pattern L_N. The semiconductor element 11$u$ is located further away from the positive power supply input pad P_P than the semiconductor elements 11$v$ and 11$w$. The semiconductor element 11$w$ is located closer to the positive power supply input pad P_P than the semiconductor elements 11$u$ and 11$v$. The semiconductor element 11$v$ is located closer to the positive power supply input pad P_P than the semiconductor element 11$u$ and further away therefrom than the semiconductor element 11$w$. Therefore, an impedance Z_PU from the semiconductor element 11$u$ to the positive power supply input pad P_P is higher than impedances Z_PV and Z_PW from the semiconductor elements 11$v$ and 11$w$ to the positive power supply input pad P_P. Additionally, the impedance Z_PW from the semiconductor element 11$w$ to the positive power supply input pad P_P is lower than the impedances Z_PU and Z_PV from the semiconductor elements 11$u$ and 11$v$ to the positive power supply input pad P_P. In addition, the impedance Z_PV from the semiconductor element 11$v$ to the positive power supply input pad P_P is lower than the impedance Z_PU from the semiconductor element 11$u$ to the positive power supply input pad P_P and higher than the impedance Z_PW from the semiconductor element 11$w$ to the positive power supply input pad P_P.

A wiring pattern L_N connected to the negative power supply input pad P_N is formed on the semiconductor substrate 10. The semiconductor elements 11$x$, 11$y$, and 11$z$ are connected to the wiring pattern L_N. The semiconductor element 11$x$ is located further away from the negative power supply input pad P_N than the semiconductor elements 11$y$ and 11$z$. The semiconductor element 11$z$ is located closer to the negative power supply input pad P_N than the semiconductor elements 11$x$ and 11$y$. The semiconductor element 11$y$ is located closer to the negative power supply input pad P_N than the semiconductor element 11$x$ and further away therefrom than the semiconductor element 11$z$. Therefore, an impedance Z_NX from the semiconductor element 11$x$ to the negative power supply input pad P_N is higher than impedances Z_NY and Z_NZ from the semiconductor elements 11$y$ and 11$z$ to the negative power supply input pad P_N. Additionally, the impedance Z_NZ from the semiconductor element 11z to the negative power supply input pad P_N is lower than the impedances Z_NX and Z_NY from the semiconductor elements 11x and 11y to the negative power supply input pad P_N. In addition, the impedance Z_NY from the semiconductor element 11y to the negative power supply input pad P_N is lower than the impedance Z_NX from the semiconductor element 11x to the negative power supply input pad P_N and higher than the impedance Z_NZ from the semiconductor element 11z to the negative power supply input pad P_N.

A portion of the wiring pattern L_P from the semiconductor element 11u to the positive power supply input pad P_P and a portion of the wiring pattern L_N from the semiconductor element 11x to the negative power supply input pad P_N have the same length as each other. Therefore, the impedance Z_PU and the impedance Z_NX have the same impedance value as each other. This allows a balanced DC voltage with substantially the same voltage drop and the like on the positive and negative sides to be input to U-phase arms formed by the semiconductor elements 11u and 11x.

A portion of the wiring pattern L_P from the semiconductor element 11v to the positive power supply input pad P_P and a portion of the wiring pattern L_N from the semiconductor element 11y to the negative power supply input pad P_N have the same length as each other. Therefore, the impedance Z_PV and the impedance Z_NY have the same impedance value as each other. This allows a balanced DC voltage with substantially the same voltage drop and the like on the positive and negative sides to be input to V-phase arms formed by the semiconductor elements 11v and 11y.

A portion of the wiring pattern L_P from the semiconductor element 11w to the positive power supply input pad P_P and a portion of the wiring pattern L_N from the semiconductor element 11z to the negative power supply input pad P_N have the same length as each other. Therefore, the impedance Z_PW and the impedance Z_NZ have the same impedance value as each other. This allows a balanced DC voltage with substantially the same voltage drop and the like on the positive and negative sides to be input to W-phase arms formed by the semiconductor elements 11w and 11z.

A connecting portion between the semiconductor element 11u and the semiconductor element 11x is connected to the U-phase output pad P_U by a wiring pattern L_OU. A connecting portion between the semiconductor element 11v and the semiconductor element 11y is connected to the V-phase output pad P_V by a wiring pattern L_OV. A connecting portion between the semiconductor element 11w and the semiconductor element 11z is connected to the W-phase output pad P_W by a wiring pattern L_OW. The wiring patterns L_OU, L_OV, and L_OW have substantially the same length and substantially the same impedance value as each other.

As illustrated in FIG. 2, the gate driver circuits 12u, 12v, 12w are arranged side by side near the signal input pads PinU, PinV, and PinW in the direction of extension of the peripheral edge of the semiconductor substrate 10 arranged with the signal input pads PinU, PinV, and PinW. The gate driver circuit 12u is connected to the signal input pad PinU by a wiring pattern L_IU formed on the semiconductor substrate 10. The gate driver circuit 12v is connected to the signal input pad PinV by a wiring pattern L_IV formed on the semiconductor substrate 10. The gate driver circuit 12w is connected to the signal input pad PinW by a wiring pattern L_IW formed on the semiconductor substrate 10.

The wiring patterns L_IU, L_IV, and L_IW have substantially the same length and substantially the same impedance value as each other. Therefore, the input signal InU input to the gate driver circuit 12u via the signal input pad PinU, the input signal InV input to the gate driver circuit 12v via the signal input pad PinV, and the input signal InW input to the gate driver circuit 12w via the signal input pad PinW have substantially the same signal delay. Therefore, the input signals InU, InV, and InW output from the controller 3 are input to the gate driver circuits 12u, 12v, and 12w at substantially the same time.

The gate driver circuit 12u is connected to the semiconductor element 11u by a wiring pattern L_U formed on the semiconductor substrate 10. The gate driver circuit 12v is connected to the semiconductor element 11v by a wiring pattern L_V formed on the semiconductor substrate 10. The gate driver circuit 12w is connected to the semiconductor element 11w by a wiring pattern L_W formed on the semiconductor substrate 10. The wiring pattern L_U has a longer length than the wiring patterns L_V and L_W. The wiring pattern L_V has a longer length than the wiring pattern L_W. Therefore, an impedance Z_U of the wiring pattern L_U is higher than an impedance Z_V of the wiring pattern L_V and an impedance Z_W of the wiring pattern L_W. Additionally, the impedance Z_V of the wiring pattern L_V is higher than the impedance Z_W of the wiring pattern L_W.

Therefore, the gate drive signal SgU output from the gate driver circuit 12u is input to the semiconductor element 11u with a voltage drop lower than a voltage at which the gate drive signal SgV output from the gate driver circuit 12v is input to the semiconductor element 11v and a voltage at which the gate drive signal SgW output from the gate driver circuit 12w is input to the semiconductor element 11w. Additionally, the gate drive signal SgV output from the gate driver circuit 12v is input to the semiconductor element 11v with a voltage drop lower than a voltage at which the gate drive signal SgW output from the gate driver circuit 12w is input to the semiconductor element 11w. Therefore, when the gate driver circuits 12u, 12v, and 12w have the same driving capability to drive the IGBTs 111u, 111v, and 111w (see FIG. 1) provided in the semiconductor elements 11u, 11v, and 11w, operation timing of the IGBTs 111u, 111v, and 111w is shifted from each other.

Although details are described later, the gate driver circuits 12u, 12v, and 12w include the determination pads Pdu, Pdv, Pdw, and a voltage set on the determination pads Pdu, Pdv, and Pdw can optimize the driving capability to drive the IGBTs 111u, 111v, and 111w. This allows the semiconductor module 1 to suppress shifting of the operation timing of the IGBTs 111u, 111v, and 111w.

As illustrated in FIG. 2, the gate driver circuits 12x, 12y, and 12z are arranged side by side near the signal input pads PinX, PinY, and PinZ in the direction of extension of the peripheral edge of the semiconductor substrate 10 arranged with the signal input pads Pinx, PinY, and PinZ. The gate driver circuit 12x is connected to the signal input pad PinX by a wiring pattern L_IX formed on the semiconductor substrate 10. The gate driver circuit 12y is connected to the signal input pad PinY by a wiring pattern L_IY formed on the semiconductor substrate 10. The gate driver circuit 12z is connected to the signal input pad PinZ by a wiring pattern L_IZ formed on the semiconductor substrate 10.

The wiring patterns L_IX, L_IY, and L_IZ have substantially the same length and substantially the same impedance value as each other. Therefore, the input signal InX input to the gate driver circuit 12x via the signal input pad PinX, the input signal InY input to the gate driver circuit 12*y* via the signal input pad PinY, and the input signal InZ input to the gate driver circuit 12*z* via the signal input pad PinZ have substantially the same signal delay. As a result, the input signals InX, InY, and InZ output from the controller 3 are input to the gate driver circuits 12*x*, 12*y*, and 12*z* with substantially the same time.

The gate driver circuit 12*x* is connected to the semiconductor element 11*x* by a wiring pattern L_X formed on the semiconductor substrate 10. The gate driver circuit 12*y* is connected to the semiconductor element 11*y* by a wiring pattern L_Y formed on the semiconductor substrate 10. The gate driver circuit 12*z* is connected to the semiconductor element 11*z* by a wiring pattern L_Z formed on the semiconductor substrate 10. The wiring pattern L_X is shorter than the wiring patterns L_Y and L_Z. The wiring pattern L_Y is shorter than the wiring pattern L_Z. Therefore, an impedance Z_X of the wiring pattern L_X is lower than an impedance Z_Y of the wiring pattern L_Y and an impedance Z_Z of the wiring pattern L_Z. Additionally, the impedance Z_Y of the wiring pattern L_Y is lower than the impedance Z_Z of the wiring pattern L_Z.

Therefore, the gate drive signal SgZ output from the gate driver circuit 12*z* is input to the semiconductor element 11*z* with a voltage drop lower than a voltage at which the gate drive signal SgX output from the gate driver circuit 12*x* is input to the semiconductor element 11*x* and a voltage at which the gate drive signal SgY output from the gate driver circuit 12*y* is input to the semiconductor element 11*y*. In addition, the gate drive signal SgY output from the gate driver circuit 12*y* is input to the semiconductor element 11*y* with a voltage drop lower than the voltage at which the gate drive signal SgX output from the gate driver circuit 12*x* is input to the semiconductor element 11*x*. As a result, when the gate driver circuits 12*x*, 12*y*, and 12*z* have the same driving capability to drive the IGBTs 111*x*, 111*y*, and 111*z* (see FIG. 1) provided in the semiconductor elements 11*x*, 11*y*, and 11*z*, operation timing of the IGBTs 111*x*, 111*y*, and 111*z* is shifted from each other.

Although details are described later, the gate driver circuits 12*x*, 12*y*, and 12*z* include the determination pads Pdx, Pdy, Pdz, and a voltage set on the determination pads Pdx, Pdy, and Pdz can optimize the driving capability to drive the IGBTs 111*x*, 111*y*, and 111*z*. This allows the semiconductor module 1 to suppress shifting of the operation timing of the IGBTs 111*x*, 111*y*, and 111*z*.

(Configuration of Gate Driver Circuits)

Figure 3:
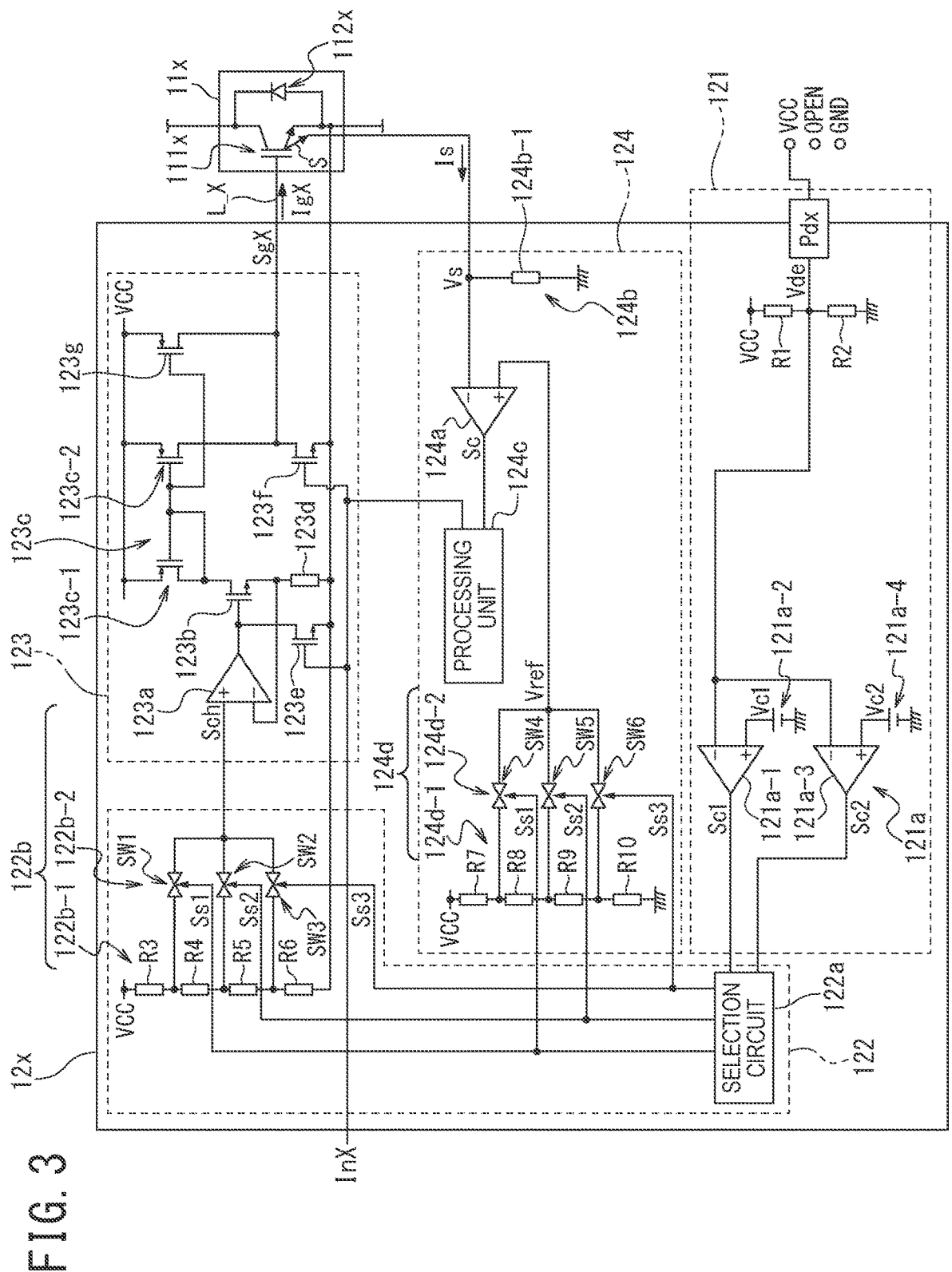
FIG. 3 is a circuit diagram illustrating one example of a schematic configuration of a gate driver circuit included in the semiconductor module according to the one embodiment of the present disclosure.

Next, the schematic configuration of the gate driver circuits 12*u*, 12*v*, 12*w*, 12*x*, 12*y*, and 12*z* included in the semiconductor module 1 according to the present embodiment is described with FIGS. 1 and 2 and using FIG. 3. The gate driver circuits 12*u*, 12*v*, 12*w*, 12*x*, 12*y*, and 12*z* have the same configuration as each other. Therefore, the schematic configuration of the gate driver circuits 12*u*, 12*v*, 12*w*, 12*x*, 12*y*, and 12*z* is described hereinbelow using the gate driver circuit 12*x* as an example. FIG. 3 is a circuit diagram illustrating one example of the schematic configuration of the gate driver circuit 12*x*. In FIG. 3, for ease of understanding, the semiconductor element 11*x* including the IGBT 111*x* that is a drive target of the gate driver circuit 12*x* is also illustrated together therewith.

As illustrated in FIG. 3, the gate driver circuit 12*x* includes a determination unit 121 that determines a positional relationship to the IGBT 111*x*. Additionally, the gate driver circuit 12*x* includes a setting unit 122 that sets the driving capability of the gate driver circuit 12*x* on the basis of a determination result of the determination unit 121. In addition, the gate driver circuit 12*x* includes a drive unit 123 that drives the IGBT 111*x* with the driving capability set by the setting unit 122. Furthermore, the gate driver circuit 12*x* includes a protection unit 124 that protects the IGBT 111*x* on the basis of a threshold value set according to a positional relationship of the driver circuit (i.e., the gate driver circuit 12*x*) provided with the protection unit 124 itself.

As illustrated in FIG. 3, the determination unit 121 includes the determination pad Pdx whose voltage level is changed according to the positional relationship of the gate driver circuit 12*x* and a discrimination unit 121*a* that discriminates the voltage level of the determination pad Pdx. The determination unit 121 includes a resistance element R1 and a resistance element R2 connected in series between power supply voltage VCC and reference potential.

The discrimination unit 121*a* includes a first comparator 121*a*-1 that compares a determination voltage Vde applied to the determination pad Pdx with a first comparison voltage Vc1. The discrimination unit 121*a* includes a second comparator 121*a*-3 that compares a voltage on the determination pad Pdx with a second comparison voltage Vc2. Each of the first comparator 121*a*-1 and the second comparator 121*a*-3 is composed of, for example, an operational amplifier.

Additionally, the discrimination unit 121*a* includes a first comparison voltage generation unit 121*a*-2 that generates the first comparison voltage Vo1 and a second comparison voltage generation unit 121*a*-4 that generates the second comparison voltage Vc2. Each of the first comparison voltage generation unit 121*a*-2 and the second comparison voltage generation unit 121*a*-4 is composed of, for example, a DC power supply. The first comparison voltage Vo1 is set to a voltage that is lower than power supply voltage VCC and higher than the second comparison voltage Vc2. The second comparison voltage Vc2 is set to a voltage that is higher than reference potential (e.g., ground potential).

An inverting input terminal (−) of the first comparator 121*a*-1 is connected to the determination pad Pdx. A non-inverting input terminal (+) of the first comparator 121*a*-1 is connected to a positive terminal of the first comparison voltage generation unit 121*a*-2. A negative terminal of the first comparison voltage generation unit 121*a*-2 is connected to a reference potential terminal (e.g., a ground terminal) set to reference potential. This causes the first comparator 121*a*-1 to compare the determination voltage Vde applied to the determination pad Pdx with the first comparison voltage Vc1 and output a first comparison signal Sc1 at high level when the determination voltage Vde is lower than the first comparison voltage Vc1. On the other hand, when the determination voltage Vde is higher than the first comparison voltage Vc1, the first comparator 121*a*-1 outputs the first comparison signal Sc1 at low level.

An inverting input terminal (−) of the second comparator 121*a*-3 is connected to the determination pad Pdx. A non-inverting input terminal (+) of the second comparator 121*a*-3 is connected to a positive terminal of the second comparison voltage generation unit 121*a*-4. A negative terminal of the second comparison voltage generation unit 121*a*-4 is connected to a reference potential terminal (e.g., a ground terminal) set to reference potential. This causes the second comparator 121*a*-3 to compare the determination voltage Vde applied to the determination pad Pdx with the second comparison voltage Vc2 and output a second comparison signal Sc2 at high level when the determination voltage Vde is lower than the second comparison voltage Vc2. On the other hand, when the determination voltage Vde is higher than the second comparison voltage Vc2, the second comparator 121a-3 outputs the second comparison signal Sc2 at low level.

As illustrated in FIG. 3, one terminal of the resistance element R1 is connected to a power supply terminal from which power supply voltage VCC is output. The other terminal of the resistance element R1 is connected to one terminal of the resistance element R2, the determination pad Pdx, the inverting input terminal of the first comparator 121a-1, and the inverting input terminal of the second comparator 121a-3. The other terminal of the resistance element R2 is connected to a reference potential terminal (e.g., a ground terminal). A resistance value of the resistance element R1 and a resistance value of the resistance element R2 are set so that a connecting portion between the resistance element R1 and the resistance element R2 has a voltage that is lower than the first comparison voltage Vc1 and higher than the second comparison voltage Vc2.

Therefore, when the determination pad Pdx is connected to the power supply terminal from which power supply voltage VCC is output, the determination voltage Vde has the same voltage level as that of the power supply voltage VCC. When the determination pad Pdx is connected to the reference potential terminal (e.g., a ground terminal), the determination voltage Vde has the same voltage value as the reference potential. When the determination pad Pdx is in an OPEN state, the voltage value of the determination voltage Vde is a voltage value obtained by resistively dividing the power supply voltage VCC by the resistance elements R1 and R2.

Accordingly, when the determination pad Pdx is connected to the power supply terminal from which power supply voltage VCC is output, the determination voltage Vde is higher than the first and second comparison voltages Vc1 and Vc2. Therefore, the voltage level of each of the first and second comparison voltages Vc1 and Vc2 becomes low. In addition, when the determination pad Pdx is connected to the reference potential terminal (e.g., the ground terminal), the determination voltage Vde is lower than the first and second comparison voltages Vc1 and Vc2. Therefore, the voltage level of each of the first and second comparison voltages Vc1 and Vc2 becomes high. Furthermore, when the determination pad Pdx is in the OPEN state, the determination voltage Vde is lower than the first comparison voltage Vc1 and higher than the second comparison voltage Vc2. Therefore, the voltage level of the first comparison voltage Vo1 becomes high, and the voltage level of the second comparison voltage Vc2 becomes low.

Thus, the determination unit 121 can determine the determination voltage Vde applied to the determination pad Pdx. In the semiconductor module 1, the positional relationships of the gate driver circuits 12x, 12y, and 12z to the IGBTs 111x, 111y, and 111z is mapped to the determination voltage Vde applied to the determination pad Pdx. This allows the determination unit 121 to determine magnitudes of the impedances Z_X, Z_Y, and Z_Z (see FIG. 2) of the wiring patterns L_X, L_Y, and L_Z through which the gate drive signals SgX, SgY, and SgZ output from the gate driver circuits 12x, 12y, and 12z are transmitted on the basis of the positional relationships of the gate driver circuits 12x, 12y, and 12z.

In the semiconductor module 1, the determination pad Pdy (see FIG. 2) of the gate driver circuit 12y connected to the wiring pattern L_Y whose impedance is second highest among the impedances Z_X, Z_Y, and Z_Z is set to the OPEN state (see FIG. 1). Additionally, as illustrated in FIG. 3, the determination pad Pdx of the gate driver circuit 12x connected to the wiring pattern L_X whose impedance is lowest among the impedances Z_X, Z_Y, and Z_Z is connected to the power supply terminal from which power supply voltage VCC is output. Furthermore, the determination pad Pdz of the gate driver circuit 12z connected to the wiring pattern L_Z whose impedance is highest among the impedances Z_X, Z_Y, and Z_Z is connected to the reference potential terminal (see FIG. 1).

In the semiconductor module 1, the determination pad Pdv (see FIG. 2) of the gate driver circuit 12v connected to the wiring pattern L_V whose impedance is second highest among the impedances Z_U, Z_V, and Z_W is set to the OPEN state (see FIG. 1). Additionally, the determination pad Pdw of the gate driver circuit 12w connected to the wiring pattern L_W whose impedance is lowest among the impedances Z_U, Z_V, and Z_W is connected to the power supply terminal from which power supply voltage VCC is output (see FIG. 1). Furthermore, the determination pad Pdu of the gate driver circuit 12u connected to the wiring pattern L_U whose impedance is highest among the impedances Z_U, Z_V, and Z_W is connected to the reference potential terminal (see FIG. 1).

As illustrated in FIG. 3, the setting unit 122 includes a selection circuit (one example of a selector) 122a that generates selection signals Ss1, Ss2, and Ss3 for selecting the driving capability of the drive unit 123 on the basis of a discrimination result of the discrimination unit 121a and a first switching unit 122b that switches the driving capability of the drive unit 123 on the basis of the selection signals Ss1, Ss2, and Ss3.

The selection circuit 122a is composed of, for example, a decoder circuit. The selection circuit 122a changes voltage levels of the selection signals Ss1, Ss2, and Ss3 according to a combination of voltage levels of each of the first comparison voltage Vc1 and the second comparison voltage Vc2 output from the discrimination unit 121a. When the respective voltage levels of the first comparison voltage Vc1 and the second comparison voltage Vc2 input from the discrimination unit 121a are low, the selection circuit 122a generates the selection signals Ss2 and Ss3 at low voltage level and generates the selection signal Ss1 at high voltage level. When the voltage level of the first comparison voltage Vc1 input from the discrimination unit 121a is low and the voltage level of the second comparison voltage Vc2 input therefrom is high, the selection circuit 122a generates the selection signals Ss1 and Ss3 at low voltage level and generates the selection signal Ss2 at high voltage level. Furthermore, when the respective voltage levels of the first and second comparison voltages Vc1 and Vc2 input from the discrimination unit 121a are high, the selection circuit 122a generates the selection signals Ss1 and Ss2 at low voltage level and generates the selection signal Ss3 at high voltage level.

Accordingly, when power supply voltage VCC is applied to the determination pad Pdx, the selection circuit 122a generates the selection signals Ss2 and Ss3 at low voltage level and generates the selection signal Ss1 at high voltage level. Additionally, when the determination pad Pdx is set to an OPEN state, the selection circuit 122a generates the selection signals Ss1 and Ss3 at low voltage level and generates the selection signal Ss2 at high voltage level. When reference potential is applied to the determination pad Pdx, the selection circuit 122a generates the selection signals Ss1 and Ss2 at low voltage level and generates the selection signal Ss3 at high voltage level.

As illustrated in FIG. 3, the first switching unit 122b includes a ladder resistance circuit 122b-1 connected to a power supply terminal from which power supply voltage VCC is output and a switch circuit 122b-2 connected to the selection circuit 122a. The ladder resistance circuit 122b-1 includes four resistance elements R3, R4, R5, and R6 connected in series between the power supply terminal from which power supply voltage VCC is output and an emitter terminal of the IGBT 111x. One terminal of the resistance element R3 is connected to the power supply terminal, and the other terminal of the resistance element R3 is connected to one terminal of the resistance element R4. The other terminal of the resistance element R4 is connected to one terminal of the resistance element R5. The other terminal of the resistance element R5 is connected to one terminal of the resistance element R6. The other terminal of the resistance element R6 is connected to the emitter terminal of the IGBT 111x.

The switch circuit 122b-2 includes three switches SW1, SW2, and SW3 whose opening and closing (OFF state and ON state) are controlled by the selection signals Ss1, Ss2, and Ss3 input from the selection circuit 122a. The switches SW1, SW2, and SW3 are composed of, for example, MOS transistors. The switch SW1 is controlled to open and close by the selection signal Ss1, the switch SW2 is controlled to open and close by the selection signal Ss2, and the switch SW3 is controlled to open and close by the selection signal Ss3. The switch SW1 goes to a closed state (ON state) when the voltage level of the selection signal Ss1 is high, and goes to an open state (OFF state) when the voltage level of the selection signal Ss1 is low. The switch SW2 goes to a closed state when the voltage level of the selection signal Ss2 is high, and goes to an open state when the voltage level of the selection signal Ss2 is low. The switch SW3 goes to a closed state when the voltage level of the selection signal Ss3 is high, and goes to an open state when the voltage level of the selection signal Ss3 is low.

An input terminal of the switch SW1 is connected to a connecting portion between the resistance elements R3 and R4. An input terminal of the switch SW2 is connected to a connecting portion between the resistance elements R4 and R5. An input terminal of the switch SW3 is connected to a connecting portion between the resistance elements R5 and R6. Respective output terminals of the switches SW1, SW2, and SW3 are connected to each other.

Accordingly, the first switching unit 122b outputs to the drive unit 123 a switching signal Sch at a voltage level obtained by resistively dividing a potential difference between a potential of the power supply voltage VCC and a potential of the emitter terminal of the IGBT 111x by the resistance elements R3, R4, R5, and R6 according to a combination of voltage levels of the selection signals Ss1, Ss2, and Ss3. Specifically, when the voltage level of the selection signal Ss1 is high and the respective voltage levels of the selection signals Ss2 and Ss3 are low, the switch SW1 is closed and the switches SW2 and SW3 are open, so that the first switching unit 122b outputs to the drive unit 123 the switching signal Sch at a maximum voltage level that can be set. When the voltage level of the selection signal Ss2 is high and the respective voltage levels of the selection signals Ss1 and Ss3 are low, the switch SW2 is closed and the switches SW1 and SW3 are open, so that the first switching unit 122b outputs to the drive unit 123 the switching signal Sch at a voltage level between the maximum and a minimum that can be set (in the present embodiment, a second highest voltage level). When the voltage level of the selection signal Ss3 is high and the respective voltage levels of the selection signals Ss1 and Ss2 are low, the switch SW3 is closed and the switches SW1 and SW2 are open, so that the first switching unit 122b outputs to the drive unit 123 the switching signal Sch at a minimum voltage level that can be set.

Accordingly, when reference potential is applied to the determination pad Pdx, the first switching unit 122b outputs to the drive unit 123 the switching signal Sch at the maximum voltage level that can be set. Additionally, when the determination pad Pdx is set to an OPEN state, the first switching unit 122b outputs to the drive unit 123 the switching signal Sch at an intermediate voltage level between the maximum and the minimum that can be set (in the present embodiment, the second highest voltage level). Furthermore, when power supply voltage VCC is applied to the determination pad Pdx, the first switching unit 122b outputs to the drive unit 123 the switching signal Sch at the minimum voltage level that can be set.

That is, among the gate driver circuits 12x, 12y, and 12z, the gate driver circuit 12x (see FIG. 2) shortest in wiring length to the IGBTs 111x, 111y, and 111z allows the first switching unit 122b to output to the drive unit 123 the switching signal Sch at the maximum voltage level that can be set. In other words, among the gate driver circuits 12x, 12y, and 12z, in the gate driver circuit 12x (see FIG. 2) connected to the wiring pattern L_X having the smallest impedance value among the wiring patterns L_X, L_Y, and L_Z connected to the IGBTs 111x, 111y, and 111z, the first switching unit 122b outputs to the drive unit 123 the switching signal Sch at the maximum voltage level that can be set.

Additionally, among the gate driver circuits 12x, 12y, and 12z, the gate driver circuit 12y (see FIG. 2) having the wiring length between longest and shortest distances to the IGBTs 111x, 111y, and 111z allows the first switching unit 122b to output to the drive unit 123 the switching signal Sch at an intermediate voltage level between a maximum and a minimum that can be set. In other words, among the gate driver circuits 12x, 12y, and 12z, in the gate driver circuit 12y (see FIG. 2) connected to the wiring pattern L_Y having an impedance value between a maximum and a minimum among the wiring patterns L_X, L_Y, and L_Z connected to the IGBTs 111x, 111y, and 111z, the first switching unit 122b outputs to the drive unit 123 the switching signal Sch at an intermediate voltage level between the maximum and the minimum that can be set.

Furthermore, among the gate driver circuits 12x, 12y, and 12z, the gate driver circuit 12z (see FIG. 2) longest in wiring length to the IGBTs 111x, 111y, and 111z allows the first switching unit 122b to output to the drive unit 123 the switching signal Sch at the minimum voltage level that can be set. In other words, among the gate driver circuits 12x, 12y, and 12z, in the gate driver circuit 12z (see FIG. 2) connected to the wiring pattern L_Z having a largest impedance value among the wiring patterns L_X, L_Y, and L_Z connected to the IGBTs 111x, 111y, and 111z, the first switching unit 122b outputs to the drive unit 123 the switching signal Sch at the minimum voltage level that can be set.

Respective resistance values of the resistance elements R3, R4, R5, and R6 are set on the basis of magnitudes of the impedances Z_X, Z_Y, and Z_Z of the wiring patterns L_X, L_Y, and L_Z. The respective resistance values of the resistance elements R3, R4, R5, and R6 are set on the basis of, for example, design values of the impedances Z_X, Z_Y, and Z_Z or measured values of the impedances Z_X, Z_Y, and Z_Z.

As illustrated in FIG. 3, the drive unit 123 includes an amplifier 123a to which the switching signal Sch output from the first switching unit 122b is input and a transistor 123b to whose gate an output signal So output from the amplifier 123a is input. The amplifier 123a is composed of, for example, an operational amplifier. The transistor 123b is composed of, for example, an N-type MOS transistor. An output terminal of the amplifier 123a is connected to the gate of the transistor 123b. A non-inverting input terminal (+) of the amplifier 123a is connected to an output terminal of the first switching unit 122b (i.e., respective output terminals of the switches SW1, SW2, and SW3).

The drive unit 123 includes a current mirror circuit 123c connected to a drain of the transistor 123b and a resistance element 123d connected to a source of the transistor 123b. One terminal of the resistance element 123d is connected to the source of the transistor 123b, and the other terminal of the resistance element 123d is connected to a reference potential terminal (e.g., a ground terminal). A connecting portion between the source of the transistor 123b and the one terminal of the resistance element 123d is connected to an inverting input terminal (−) of the amplifier 123a.

The current mirror circuit 123c includes a transistor 123c-1 and a transistor 123c-2 whose gates are connected to each other. Each of the transistor 123c-1 and the transistor 123c-2 is composed of, for example, a P-type MOS transistor. A source of the transistor 123c-1 is connected to a power supply terminal from which power supply voltage VCC is output, and a drain of transistor 123c-1 is connected to the gates of the transistors 123c-1 and 123c-2 and the drain of the transistor 123b.

The drive unit 123 includes a transistor 123e and a transistor 123f whose gates are connected to the controller 3 (not illustrated in FIG. 3; see FIG. 1). Each of the transistors 123e and 123f is composed of, for example, an N-type MOS transistor. The input signal InX output from the controller 3 is input to the respective gates of the transistors 123e and 123f. This allows an ON state/OFF state (a conducting state/non-conducting state) of the transistors 123e and 123f to be controlled by the controller 3. The transistors 123e and 123f are in an ON state (a conducting state) when the voltage level of the input signal InX is high, and are in an OFF state (a non-conducting state) when the voltage level of the input signal InX is low. The ON state/OFF state of the transistors 123e and 123f are synchronously controlled, and the transistors 123e and 123f are controlled so as to switch from ON to OFF or from OFF to ON almost simultaneously.

Sources of the transistors 123e and 123f are connected to each other. Additionally, the sources of the transistors 123e and 123f are connected to the other terminal of the resistance element 123d and the reference potential terminal (e.g., a ground terminal). A drain of the transistor 123e is connected to a connecting portion between the output terminal of the amplifier 123a and the gate of the transistor 123b. A drain of the transistor 123f is connected to a drain of the transistor 123c-2. A connecting portion between the drain of the transistor 123f and the drain of the transistor 123c-2 is connected to a gate terminal of the IGBT 111x.

The drive unit 123 includes a transistor 123g having a gate connected to the current mirror circuit 123c. The transistor 123g is composed of, for example, a P-type MOS transistor. The gate of the transistor 123g is connected to the respective gates of the transistors 123c-1 and 123c-2. A source of the transistor 123g is connected to the power supply terminal from which power supply voltage VCC is output. A drain of the transistor 123g is connected to the respective drains of the transistors 123c-2 and 123f and the gate terminal of the IGBT 111x.

The drive unit 123 having the above configuration goes to a non-operating state when the voltage level of the input signal Inx is high, and does not output the gate drive signal SgX to the IGBT 111x. More specifically, each of the transistors 123e and 123f goes to an ON state when the input signal InX at high voltage level is input to the gate of each thereof. Therefore, the transistor 123b is turned OFF because the gate thereof is connected to the reference potential terminal via the transistor 123e. This causes the current mirror circuit 123c to flow no current to the reference potential terminal, so that the gate drive signal SgX is not output to the gate terminal of the IGBT 111x. In addition, the IGBT 111x goes to a non-operating state since the gate terminal thereof is connected to the reference potential terminal via the transistor 123f.

On the other hand, when the voltage level of the input signal InX is low, the drive unit 123 goes to an operating state and outputs the gate drive signal SgX to the IGBT 111x. More specifically, each of the transistors 123e and 123f is turned OFF when the input signal InX at low voltage level is input to the gate of each thereof. This causes the gate of the transistor 123b to be electrically disconnected from the reference potential terminal by the transistor 123e. As a result, the output signal So from the amplifier 123a is input to the gate of the transistor 123b to turn ON the transistor 123b. The transistor 123b is feedback-controlled by the amplifier 123a so that the source thereof has the same voltage as the voltage of the switching signal Sch input to the amplifier 123a. The amplifier 123a and the transistor 123b function as a constant current source whose current value is determined by the voltage level of the switching signal Sch.

As a result, a current according to the voltage level of the switching signal Sch flows from the current mirror circuit 123c to the reference potential terminal via the transistor 123b and the resistance element 123d. The current according to the voltage level of the switching signal Sch also flows to the transistor 123c-2 side forming the current mirror circuit 123c and the transistor 123g. Since the transistor 123f is in the non-conducting state (OFF state), the current flowing from the transistors 123c-2 and 123g flows, as a gate drive current, to the gate terminal of the IGBT 111x. The transistor 123g is formed in a larger transistor size than the transistor 123c-2. Therefore, the transistor 123g flows a larger current than the transistor 123c-2 to the gate terminal of the IGBT 111x. This causes the gate drive signal SgX based on the voltage level of the switching signal Sch to be input to the gate terminal of the IGBT 111x. As a result, the IGBT 111x is driven with a driving capability according to a gate drive voltage based on the gate drive signal SgX input to the gate terminal thereof.

Thus, the amplifier 123a and the transistor 123b functions as the constant-current source whose current value is determined by the voltage level of the switching signal Sch. The switching signal Sch varies depending on the magnitude of the determination voltage Vde applied to the determination pad Pdx. When power supply voltage VCC is applied to the determination pad Pdx, the switching signal Sch has the maximum voltage level that can be set, so that the amplifier 123a outputs a highest voltage that can be set. In this case, a source-drain voltage of the transistor 123c-1 is the lowest that can be set, and therefore, the amplifier 123a and the transistor 123b operate so that a minimum current that can be set flows from the current mirror circuit 123c. As a result, since current flowing from the transistors 123c-2 and 123g to the IGBT 111x is the minimum that can be set, the driving capability of the gate driver circuit 12x is set to the lowest that can be set.

When the determination pad Pdx is set to an OPEN state, the switching signal Sch has a voltage level between a maximum and a minimum that can be set (in the present embodiment, a second highest voltage level). Therefore, the amplifier 123a has an intermediate voltage level between the maximum and the minimum that can be set, and thus outputs a voltage lower than a voltage when power supply voltage VCC is applied to the determination pad Pdx. In this case, the source-drain voltage of the transistor 123c-1 is higher than when power supply voltage VCC is applied to the determination pad Pdx. This causes the amplifier 123a and the transistor 123b to operate so that a larger current than when power supply voltage VCC is applied to the determination pad Pdx flows from the current mirror circuit 123c. As a result, since current flowing from the transistors 123c-2 and 123g to the IGBT 111x becomes larger than when power supply voltage VCC is applied to the determination pad Pdx, the gate driver circuit 12x is set to a higher driving capability state than a lowest driving capability that can be set.

When reference potential is applied to the determination pad Pdx, the switching signal Sch has a lowest voltage level that can be set. Therefore, the amplifier 123a has the lowest voltage level that can be set, and thus outputs a lowest voltage that can be set. In this case, the source-drain voltage of the transistor 123c-1 is the highest that can be set, so that the amplifier 123a and the transistor 123b operate so that a largest current that can be set flows from the current mirror circuit 123c. As a result, since current flowing from the transistors 123c-2 and 123g to the IGBT 111x is the largest that can be set, the gate driver circuit 12x is set to a highest driving capability state that can be set.

Thus, the semiconductor module 1 can set the driving capability of the gate driver circuit 12x to a desired state by setting the voltage level to be applied to the determination pad Pdx according to the positional relationship of the gate driver circuit 12x to the IGBT 111x. Although a detailed description is omitted, as in the gate driver circuit 12x, the semiconductor module 1 can set driving capabilities of the gate driver circuits 12u, 12v, 12w, 12y, and 12z to a desired state by setting a voltage level to be applied to the determination pads Pdu, Pdv, Pdw, Pdy, and Pdz according to the positional relationships of the gate driver circuits 12u, 12v, 12w, 12y, and 12z to the IGBTs 111u, 111v, 111w, 111y, and 111z.

As illustrated in FIG. 3, the IGBT 111x includes the current detection element S for detecting current flowing through itself (i.e., the IGBT 111x). The protection unit 124 includes a conversion unit 124b that converts a detection current Is detected by the current detection element S of the IGBT 111x to a detection voltage Vs. Additionally, the protection unit 124 includes a second switching unit 124d that switches a reference voltage Vref as a threshold value according to the positional relationship of the gate driver circuit 12x provided with the second switching unit 124d itself and a comparator (one example of a comparator) 124a that compares the detection voltage Vs with the reference voltage Vref. Furthermore, the protection unit 124 includes a processing unit 124c that determines whether or not to protect the IGBT 111x on the basis of a comparison result of the comparator 124a and executes protection processing when it determines to protect the IGBT 111x. Although a detailed description is given later, the protection unit 124 is configured so as to protect the IGBT 111x when the IGBT 111x has abnormal initial transient characteristics.

The conversion unit 124b includes a resistance element 124b-1 connected between the current detection element S of the IGBT 111x and a reference potential terminal (e.g., a ground terminal). The conversion unit 124b outputs the detection current Is as the detection voltage Vs from a connecting portion between the current detection element S of the IGBT 111x and the resistance element 124b-1.

The second switching unit 124d includes a ladder resistance circuit 124d-1 connected to a power supply terminal from which power supply voltage VCC is output and a switch circuit 124d-2 connected to the selection circuit 122a. The ladder resistance circuit 124d-1 includes four resistance elements R7, R8, R9, and R10 connected in series between the power supply terminal from which power supply voltage VCC is output and a reference potential terminal (e.g., a ground terminal). One terminal of the resistance element R7 is connected to the power supply terminal, and the other terminal of the resistance element R7 is connected to one terminal of the resistance element R8. The other terminal of the resistance element R8 is connected to one terminal of the resistance element R9. The other terminal of the resistance element R9 is connected to one terminal of the resistance element R10. The other terminal of the resistance element R10 is connected to the reference potential terminal.

The switch circuit 124d-2 includes three switches SW4, SW5, and SW6 whose opening and closing (OFF state and ON state) is controlled by the selection signals Ss1, Ss2, and Ss3 input from the selection circuit 122a. The switches SW4, SW5, and SW6 are composed of, for example, MOS transistors. The switch SW4 is controlled to open and close by the selection signal Ss1, the switch SW5 is controlled to open and close by the selection signal Ss2, and the switch SW6 is controlled to open and close by the selection signal Ss3. The switch SW4 is closed (an ON state) when the voltage level of the selection signal Ss1 is high, and is open (an OFF state) when the voltage level of the selection signal Ss1 is low. The switch SW5 is closed when the voltage level of the selection signal Ss2 is high, and is open when the voltage level of the selection signal Ss2 is low. The switch SW6 is closed when the voltage level of the selection signal Ss3 is high, and is open when the voltage level of the selection signal Ss3 is low.

An input terminal of the switch SW4 is connected to a connecting portion between the resistance elements R7 and R8. An input terminal of the switch SW5 is connected to a connecting portion between the resistance elements R8 and R9. An input terminal of the switch SW6 is connected to a connecting portion between the resistance elements R9 and R10. Respective output terminals of the switches SW4, SW5, and SW6 are connected to each other.

Accordingly, the second switching unit 124d outputs to the comparator 124a the reference voltage Vref at a voltage level obtained by resistively dividing the power supply voltage VCC by the resistance elements R7, R8, R9, and R10 according to a combination of voltage levels of the selection signals Ss1, Ss2, and Ss3. Specifically, when the voltage level of the selection signal Ss1 is high and voltage levels of each of the selection signals Ss2 and Ss3 are low, the switch SW4 is closed and the switches SW5 and SW6 are open, so that the second switching unit 124d outputs to the comparator 124a the reference voltage Vref at a highest voltage level that can be set. When the voltage level of the selection signal Ss2 is high and voltage levels of each of the selection signals Ss1 and Ss3 are low, the switch SW5 is closed and the switches SW4 and SW6 are open, so that the second switching unit 124d outputs to the comparator 124a the reference voltage Vref at an intermediate voltage level between the maximum and a minimum that can be set (in the present embodiment, a second highest voltage level). When the voltage level of the selection signal Ss3 is high and voltage levels of each of the selection signals Ss1 and Ss2 are low, the switch SW6 is closed and the switches SW4 and SW5 are open, so that the second switching unit 124d outputs to the comparator 124a the reference voltage Vref at a lowest voltage level that can be set.

Accordingly, when reference potential is applied to the determination pad Pdx, the second switching unit 124d outputs to the comparator 124a the reference voltage Vref at the maximum voltage level that can be set. Additionally, when the determination pad Pdx is set to an OPEN state, the second switching unit 124d outputs to the comparator 124a the reference voltage Vref at an intermediate voltage level between the maximum and the minimum that can be set (in the present embodiment, the second highest voltage level). Furthermore, when power supply voltage VCC is applied to the determination pad Pdx, the second switching unit 124d outputs to the comparator 124a the reference voltage Vref at the minimum voltage level that can be set.

That is, among the gate driver circuits 12x, 12y, and 12z, the gate driver circuit 12x (see FIG. 2) shortest in wiring length to the IGBTs 111x, 111y, and 111z allows the second switching unit 124d to output to the comparator 124a the reference voltage Vref at the maximum voltage level that can be set. In other words, among the gate driver circuits 12x, 12y, and 12z, in the gate driver circuit 12x (see FIG. 2) connected to the wiring pattern L_X having the smallest impedance value among the wiring patterns L_X, L_Y, and L_Z connected to the IGBTs 111x, 111y, and 111z, the second switching unit 124d outputs to the comparator 124a the reference voltage Vref at the maximum voltage level that can be set.

Additionally, among the gate driver circuits 12x, 12y, and 12z, the gate driver circuit 12y (see FIG. 2) having the wiring length between the longest and shortest distances to the IGBTs 111x, 111y, and 111z allows the second switching unit 124d to output to the comparator 124a the reference voltage Vref at an intermediate voltage level between a maximum and a minimum that can be set. In other words, among the gate driver circuits 12x, 12y, and 12z, in the gate driver circuit 12y (see FIG. 2) connected to the wiring pattern L_Y having the impedance value between the maximum and the minimum among the wiring patterns L_X, L_Y, and L_Z connected to the IGBTs 111x, 111y, and 111z, the second switching unit 124d outputs to the comparator 124a the reference voltage Vref at an intermediate voltage level between the maximum and the minimum that can be set.

Furthermore, among the gate driver circuits 12x, 12y, and 12z, the gate driver circuit 12z (see FIG. 2) longest in wiring length to the IGBTs 111x, 111y, and 111z allows the second switching unit 124d to output to the comparator 124a the reference voltage Vref at a minimum voltage level that can be set. In other words, among the gate driver circuits 12x, 12y, and 12z, in the gate driver circuit 12z (see FIG. 2) connected to the wiring pattern L_Z having the largest impedance value among the wiring patterns L_X, L_Y, and L_Z connected to the IGBTs 111x, 111y, and 111z, the second switching unit 124d outputs to the comparator 124a the reference voltage Vref at the minimum voltage level that can be set.

Resistance values of each of the resistance elements R7, R8, R9, and R10 are set on the basis of magnitudes of the impedances Z_X, Z_Y, and Z_Z of the wiring patterns L_X, L_Y, and L_Z. The resistance values of each of the resistance elements R7, R8, R9, and R10 are set on the basis of, for example, design values of the impedances Z_X, Z_Y, and Z_Z or measured values of the impedances Z_X, Z_Y, and Z_Z.

Thus, the second switching unit 124d is configured to use the selection signals Ss1, Ss2, and Ss3 generated by the selection circuit 122a to determine the positional relationship of the gate driver circuit 12x to the IGBT 111x. However, the semiconductor module 1 may include a determination unit and a selection circuit having the same configurations as those of the determination unit 121 and the selection circuit 122a, and the second switching unit 124d may be configured to switch the voltage level of the reference voltage Vref using the determination unit and selection signals generated by the selection circuit.

As illustrated in FIG. 3, the comparator 124a provided in the protection unit 124 is composed of, for example, an operational amplifier. An inverting input terminal (−) of the comparator 124a is connected to one terminal of the resistance element 124b-1 provided in the conversion unit 124b and the current detection element S of the IBGT 111x. A non-inverting input terminal (+) of the comparator 124a is connected to an output terminal of the second switching unit 124d. In other words, the non-inverting input terminal (+) of the comparator 124a is connected to the respective output terminals of the switches SW4, SW5, and SW6. An output terminal of the comparator 124a is connected to the processing unit 124c.

This allows the comparator 124a to compare the detection voltage Vs input from the conversion unit 124b with the reference voltage Vref input from the second switching unit 124d and output to the processing unit 124c a comparison signal Sc at high level when the detection signal Vs is lower than the reference voltage Vref. On the other hand, when the detection voltage Vs is higher than the reference voltage Vref, the comparator 124a outputs the comparison signal Sc at low level.

The reference voltage Vref output from the second switching unit 124d is lowest when reference potential is applied to the determination pad Pdx, is highest when power supply voltage VCC is applied to the determination pad Pdx, and is between the maximum and minimum voltages when the determination pad Pdx is set to an OPEN state. In other words, the closer the positional relationship of the gate driver circuit 12x to the IGBT 111x, the lower the voltage level of the reference voltage Vref, and the farther the positional relationship thereof, the higher the voltage level of the reference voltage Vref.

In the semiconductor module 1, among the positional relationship of the gate driver circuit 12x to the IGBT 111x, the positional relationship of the gate driver circuit 12z to the IGBT 111z, and the positional relationship of the gate driver circuit 12y to the IGBT 111y, the positional relationship of the gate driver circuit 12x is closest, the positional relationship of the gate driver circuit 12y is second closest, and the positional relationship of the gate driver circuit 12z is farthest. Accordingly, among the gate driver circuits 12x, 12y, and 12z, the gate driver circuit 12x having the shortest distance to IGBT has the reference voltage Vref at a highest voltage level. Additionally, among the gate driver circuits 12x, 12y, and 12z, the gate driver circuit 12y having the second shortest distance to IGBT has the reference voltage Vref at a second highest voltage level. Furthermore, among the gate driver circuits 12x, 12y, and 12z, the gate driver circuit 12z having the longest distance to IGBT has the reference voltage Vref at a lowest voltage level.

In other words, in the semiconductor module 1, among the gate driver circuits 12x, 12y, and 12z, the gate driver circuit 12x connected to the IGBT 111x by the wiring pattern L_X having the lowest impedance Z_X has the reference voltage Vref at the highest voltage level. Additionally, among the gate driver circuits 12x, 12y, and 12z, the gate driver circuit 12y connected to the IGBT 111y by the wiring pattern L_Y having the second lowest impedance Z_Y has the reference voltage Vref at the second highest voltage level. Furthermore, among the gate driver circuits 12x, 12y, and 12z, the gate driver circuit 12z connected to the IGBT 111z by the wiring pattern L_Z having the highest impedance Z_X has the reference voltage Vref at the lowest voltage level.

Thus, the semiconductor module 1 can set a threshold value for abnormality determination (i.e., the reference voltage Vref) to an optimum value according to the positional relationships of the gate driver circuits 12x, 12y, and 12z to the IGBTs 111x, 111y, and 111z.

When the voltage level of the comparison signal Sc input from the comparator 124a is low for a certain time period, the processing unit 124c determines that the IGBT 111x has an initial transient abnormality. When the IGBT 111x is determined to have an initial transient abnormality, the processing unit 124c stops supply of gate drive current to the IGBT 111x. For example, the processing unit 124c switches the transistor 123f provided in the drive unit 123 to an ON state so that current output from the transistors 123c-2 and 123g flows not to the gate terminal of the IGBT 111x but to the reference potential terminal, thereby enabling stop of operation of the IGBT 111x. This allows the protection unit 124 to prevent overcurrent associated with the initial transient abnormality from flowing to the IGBT 111x so as to protect the IGBT 111x from failing.

The gate driver circuits 12u, 12v, 12w, 12y, and 12z include a protection unit having the same configuration as the protection unit 124 provided in the gate driver circuit 12x. Therefore, as in the gate driver circuit 12x, the gate driver circuits 12u, 12v, 12w, 12y, and 12z can prevent overcurrent associated with an initial transient abnormality from flowing to the IGBTs 111u, 111v, 111w, 111y, and 111z to protect the IGBTs 111u, 111v, 111w, 111y, and 111z from failing. Thus, the semiconductor module 1 can protect the 111u, 111v, 111w, 111x, 111y, and 111z individually.

(Operation and Effects of Gate Driver Circuits)

Before describing operation and effects of the semiconductor module 1 according to the present embodiment, problems of a semiconductor module as a comparative example are described.

In the field of semiconductor modules, gate drive current is designed to an optimal value so that loss and noise of a gate drive signal output from a gate driver circuit to an IGBT are reduced. In a semiconductor module are arranged gate driver circuits and semiconductor switching elements such as IGBTs, and external terminals of the semiconductor module and the semiconductor switching elements are connected by wiring patterns and bonding wires formed on a semiconductor substrate. Depending on the arrangement of components such as the gate driver circuits provided in the semiconductor module, influence due to respective impedances (wiring impedances) of power supply patterns, reference potential patterns (e.g., ground patterns), and the wiring patterns are different from component to component. At least two of the following influences may overlap: the influence of power supply voltage swing due to the different impedances on electrical characteristics of the semiconductor switching elements, the influence of different magnitudes of voltage drops of various signals such as a gate drive signal due to wiring impedances, and the influence of noise due to inter-wiring coupling. In this case, problems may occur in any of the U-, V-, and W-phases, such as deviation of a signal waveform of the gate drive signal from an optimally designed signal waveform and occurrence of ringing in a signal waveform of a current detection signal that is different from ringing in the optimally designed signal waveform.

Figure 4:
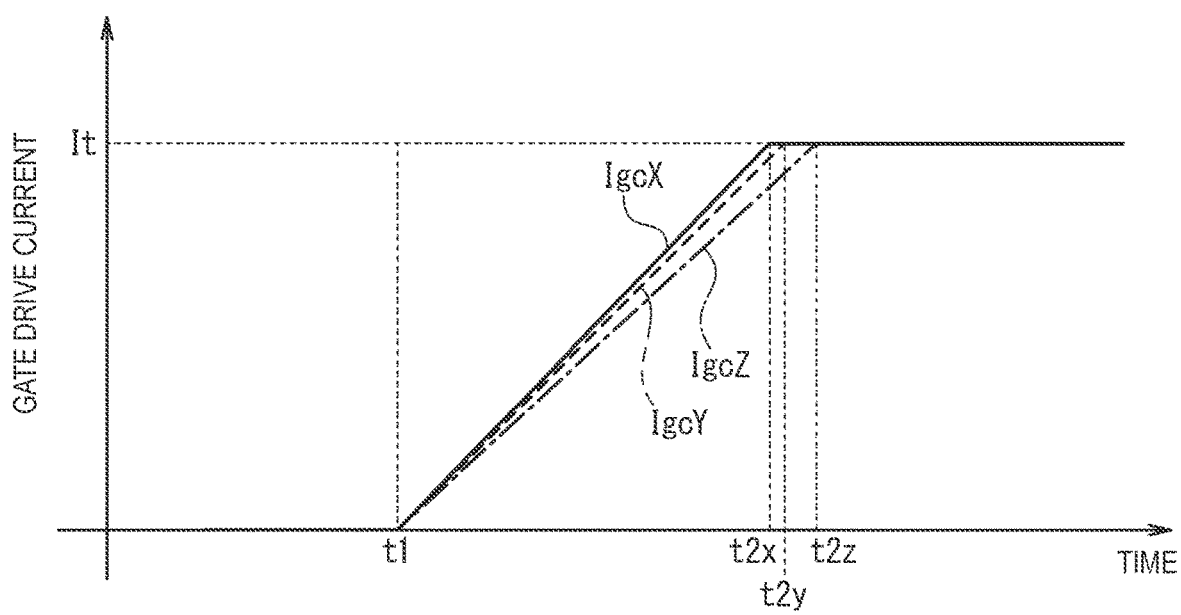
FIG. 4 is a diagram schematically illustrating one example of a current waveform of a gate drive current in a semiconductor module according to a comparative example.
Figure 5:
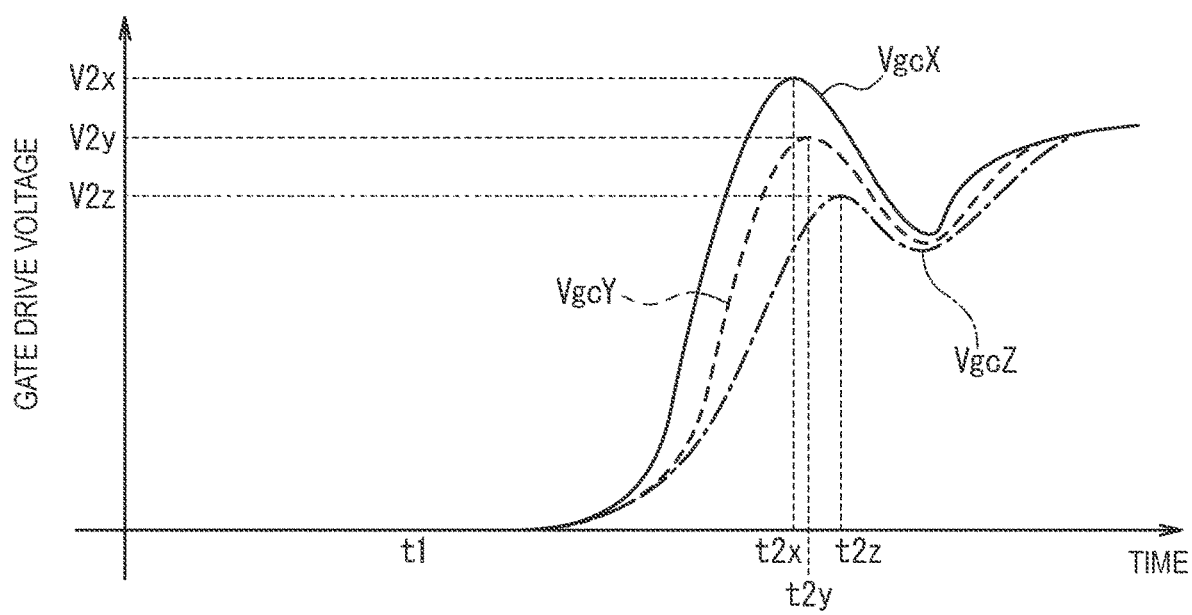
FIG. 5 is a diagram schematically illustrating one example of a voltage waveform of a gate drive voltage in the semiconductor module according to the comparative example.
Figure 6:
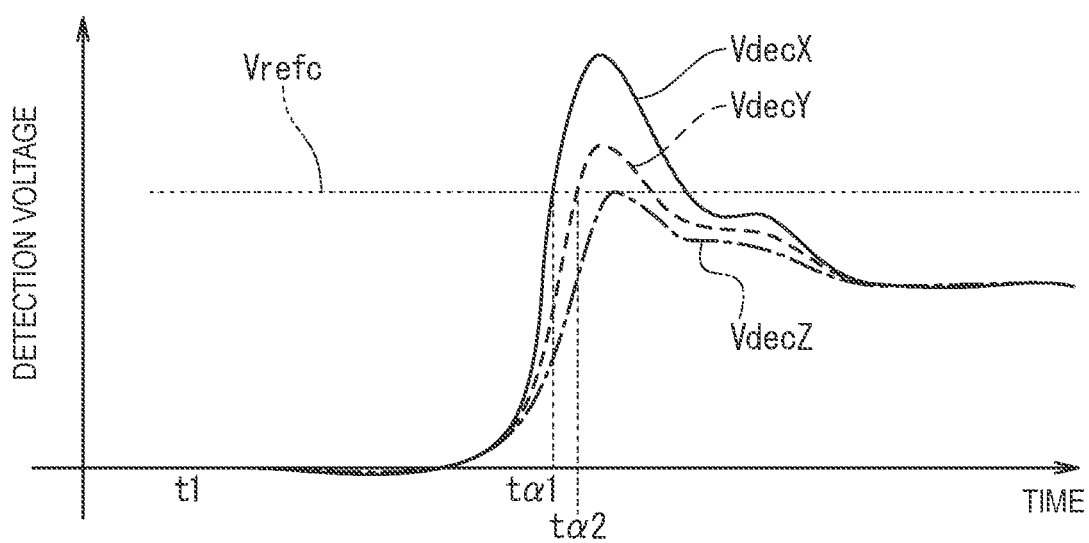
FIG. 6 is a diagram schematically illustrating one example of a voltage waveform of a detection voltage in the semiconductor module according to the comparative example.

The problems are described in detail using FIGS. 4 to 6. FIG. 4 is a diagram schematically illustrating one example of a current waveform of a gate drive current in a semiconductor module according to a comparative example. The horizontal axis of a graph illustrated in FIG. 4 represents time, and the vertical axis thereof illustrated in FIG. 4 represents gate drive current. FIG. 5 is a diagram schematically illustrating one example of a voltage waveform of a gate drive voltage in the semiconductor module according to the comparative example. The horizontal axis of a graph illustrated in FIG. 5 represents time, and the vertical axis thereof illustrated in FIG. 5 represents gate drive voltage. FIG. 6 is a diagram schematically illustrating one example of a voltage waveform of a detection voltage in the semiconductor module according to the comparative example. The horizontal axis of a graph illustrated in FIG. 6 represents time, and the vertical axis thereof illustrated in FIG. 6 represents detection voltage.

Although illustration is omitted, the semiconductor module according to the comparative example has the same configuration as that of the semiconductor module 1 according to the present embodiment except that gate driver circuits do not include the determination unit 121, the setting unit 122, and the second switching unit 124d. Therefore, in the semiconductor module according to the comparative example, a plurality of gate driver circuits forming upper and lower arms cannot change their driving capability according to positional relationships thereof to IGBTs, and are set to have the same driving capability as each other regardless of the positional relationships thereof.

Hereinafter, for convenience of description, in the semiconductor module according to the comparative example, a gate driver circuit that corresponds to the gate driver circuit 12x in the present embodiment and that is connected to an IGBT forming a U-phase lower arm is referred to as "a gate driver circuit 12cx". Additionally, in the semiconductor module according to the comparative example, a gate driver circuit that corresponds to the gate driver circuit 12y in the present embodiment and that is connected to an IGBT forming a V-phase lower arm is referred to as "a gate driver circuit 12cy". In addition, in the semiconductor module according to the comparative example, a gate driver circuit that corresponds to the gate driver circuit 12z in the present embodiment and that is connected to an IGBT forming a W-phase lower arm is referred to as "a gate driver circuit 12cz". Furthermore, the IGBT to which the gate driver circuit 12cx is connected is referred to as "an IGBT 111cx", the IGBT to which the gate driver circuit 12cy is connected is referred to as "an IGBT 111cy", and the IGBT to which the gate driver circuit 12cz is connected is referred to as "an IGBT 111cz". Still furthermore, a wiring pattern that connects the gate driver circuit 12cx to the IGBT 111cx is referred to as "a wiring pattern cL_X", a wiring pattern that connects the gate driver circuit 12cy to the IGBT 111cy is referred to as "a wiring pattern cL_Y", and a wiring pattern that connects the gate driver circuit 12cz to the IGBT 111cz is referred to as "a wiring pattern cL_Z".

Here, assume that the semiconductor module according to the comparative example includes the same component arrangement as that in the semiconductor module 1 according to the present embodiment illustrated in FIG. 2. Therefore, with respect to respective IGBTs as drive targets, the gate driver circuit 12cx is arranged closest, the gate driver circuit 12cy is arranged second closest, and the gate driver circuit 12cz is arranged farthest. In the semiconductor module according to the comparative example, the gate driver circuit 12cy is set to have an optimum driving capability to drive the IGBT as the drive target. In other words, in the semiconductor module according to the comparative example, respective driving capabilities of the gate driver circuits 12cx, 12cy, and 12cz are set so as to enable optimal IGBT driving via impedance of the wiring pattern cL_Y. The wiring pattern cL_X has an impedance value smaller than the impedance of the wiring pattern cL_Y, and the wiring pattern cL_Z has an impedance value larger than the impedance of the wiring pattern cL_Y. Therefore, the driving capability of the gate driver circuit 12cx is higher than an optimal driving capability to drive the IGBT 111cx, and the driving capability of the gate driver circuit 12cz is lower than an optimal driving capability to drive the IGBT 111cz.

As a result, as illustrated in FIG. 4, when, for example, at time t1, input signals corresponding to the input signals InX, InY, and InZ are input to the gate driver circuits 12cx, 12cy, and 12cz, a gate drive current IgcY that is output to the IGBT 111cy by the gate driver circuit 12cy set to the optimal driving capability reaches a desired current value It at a desired time t2y. As a result, as illustrated in FIG. 5, a gate drive voltage VgcY of the IGBT 111cy reaches a voltage V2y at time t2y.

Additionally, in this case, a gate drive current IgcX output to the IGBT 111cx by the gate driver circuit 12cx set higher than the optimal driving capability reaches the desired current value It at time t2x, which is earlier than the desired time t2y. As a result, as illustrated in FIG. 5, a gate drive voltage VgcX of the IGBT 111cx reaches a voltage V2x at time t2x. Furthermore, in this case, a gate drive current IgcZ output to the IGBT 111cz by the gate driver circuit 12cz set lower than the optimal driving capability reaches the desired current value It at time t2z, which is later than the desired time t2y. As a result, as illustrated in FIG. 5, a gate drive voltage VgcZ of the IGBT 111cz reaches a voltage V2z at time t2z. Still furthermore, at time t3 after a predetermined time from time t2z, the gate drive voltages VgcX, VgcY, and VgcZ have substantially the same voltage value.

Thus, the gate drive voltage VgcX output to the IGBT 111cx by the gate driver circuit 12cx set higher than the optimal driving capability reaches the higher voltage at the earlier time compared with the gate drive voltage VgcY output to the IGBT 111cy by the gate driver circuit 12cy set to the optimal driving capability. On the other hand, the gate drive voltage VgcZ output to the IGBT 111cz by the gate driver circuit 12cz set lower than the optimal driving capability reaches the lower voltage at the later time compared with the gate drive voltage VgcY output to the IGBT 111cy by the gate driver circuit 12cy set to the optimal driving capability.

When, as in the gate drive voltage VgcX, voltage rises earlier than the optimal timing and the maximum value thereof is higher than the optimal voltage, noise occurring during a turn-on of the IGBT 111cx increases. Additionally, when, as in the gate drive voltage VgcZ, voltage rises later than the optimal timing, switching losses of the IGBT 111cz increase. Therefore, the semiconductor module according to the comparative example has problems with the occurrence of noise exceeding an allowable range and increased switching losses.

When the IGBTs 111cx, 111cy, and 111cz are turned on by the gate drive voltages VgcX, VgcY, and VgcZ illustrated in FIG. 5, a detection current flows from a current detection element provided in each of the IGBTs 111cx, 111cy, and 111cz. The detection currents flowing from the current detection elements are proportional to collector-emitter currents of the IGBTs 111cx, 111cy, and 111cz. The collector-emitter currents of the IGBTs 111cx, 111cy, and 111cz rise in response to rising of the gate drive voltages VgcX, VgcY, and VgcZ of the IGBTs 111cx, 111cy, and 111cz. On the other hand, detection voltages obtained by converting detection currents to voltages using resistance elements are proportional to the detection currents. Therefore, the detection voltages rise in response to rising of the gate drive voltages VgcX, VgcY, and VgcZ.

As illustrated in FIG. 6, in the semiconductor module according to the comparative example, respective reference voltages Vrefc set in protection units provided in the gate driver circuits 12cx, 12cy, and 12cz are set to the same voltage value. In the semiconductor module according to the comparative example, the reference voltage Vrefc is set on the basis of the detection current in the gate driver circuit 12cy set to the optimal driving capability. Therefore, when the IGBT 111cy is normally operating, a detection voltage VdecY does not become higher than the reference voltage Vrefc until time tα2, which is a predetermined timing, after it begins to rise.

On the other hand, a detection voltage VdecX in the IGBT 111cx rises earlier than the detection voltage VdecY in response to rising of the gate drive voltage VgcX earlier than the gate drive voltage VgcY. Therefore, even when the IGBT 111cx is normally operating, the detection voltage VdecX does not become higher than the reference voltage Vrefc until time tα1 earlier than time tα2, as illustrated in FIG. 6. This results in causing the protection unit provided in the gate driver circuit 12cx to determine that the initial transient characteristics of the IGBT 111cx are not normal and there is something abnormal occurring in the IGBT 111cx.

Additionally, a detection voltage VdecZ in the IGBT 111cz rises later than the detection voltage VdecY in response to rising of the gate drive voltage VgcZ later than the gate drive voltage VgcY. Furthermore, since a maximum value of the gate drive voltage VgcZ during the rising thereof is lower than that of the gate drive voltage VgcY (see FIG. 5), a maximum value of the detection voltage VdecZ is lower than a maximum value of the detection voltage VdecY, as illustrated in FIG. 6, and is, for example, a voltage equal to or lower than the reference voltage Vrefc. Therefore, even when the IGBT 111cz is abnormally operating, the detection voltage VdecZ is not higher than the reference voltage Vrefc. This results in causing the protection unit provided in the gate driver circuit 12cz to determine that the initial transient characteristics of the IGBT 111cz are normal and there is nothing abnormal occurring in the IGBt 111cz.

Thus, the semiconductor module according to the comparative example has a problem where the initial transient characteristics of at least one of the IGBTs 111cx, 111cy, and 111cz (in the present example, the two IGBTs 111cx and 111cz) cannot be accurately determined. Although a detailed description is omitted, the semiconductor module according to the comparative example cannot accurately determine the initial transient characteristics of at least any one of the IGBTs forming upper arms of each of the U-, V-, and W-phases.

Next, operation and effects of the gate driver circuits 12u, 12v, 12w, 12x, 12y, and 12z included in the semiconductor module 1 according to the present embodiment are described with reference to FIGS. 1 to 3 and using FIGS. 7 to 9. The gate driver circuits 12u, 12v, 12w, 12x, 12y, and 12z included in the semiconductor module 1 have the same configuration as each other and operate in the same manner. Therefore, operation of the gate driver circuits 12*u*, 12*v*, 12*w*, 12*x*, 12*y*, and 12*z* is described hereinafter using the gate driver circuits 12*x*, 12*y*, and 12*z* as an example. Additionally, in the description of operation and effects of the gate driver circuits 12*x*, 12*y*, and 12*z*, components of each of the gate driver circuits 12*x*, 12*y*, and 12*z* are described using the same reference signs as those of the components of the gate driver circuit 12*x* illustrated in FIG. 3. In addition, while the IGBTs 111*x*, 111*y*, and 111*z* driven by the gate driver circuits 12*x*, 12*y*, and 12*z* are turned on and turned off at different times from each other, the following description assumes that they are turned on simultaneously, for ease of understanding.

Figure 7:
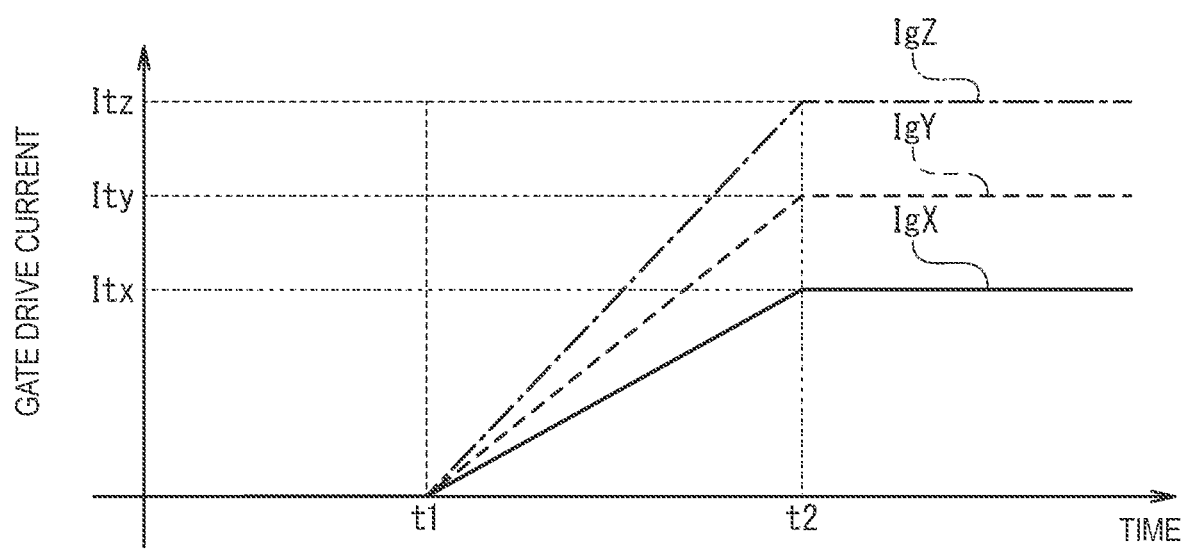
FIG. 7 is a diagram schematically illustrating one example of a current waveform of a gate drive current in the semiconductor module according to the one embodiment of the present disclosure.

FIG. 7 is a diagram schematically illustrating one example of a current waveform of a gate drive current in the semiconductor module 1. The horizontal axis of a graph illustrated in FIG. 7 represents time, and the vertical axis thereof illustrated in FIG. 7 represents gate drive current. FIG. 8 is a diagram schematically illustrating one example of a voltage waveform of a gate drive voltage in the semiconductor module 1. The horizontal axis of a graph illustrated in FIG. 8 represents time, and the vertical axis thereof illustrated in FIG. 8 represents gate drive voltage. FIG. 9 is a diagram schematically illustrating one example of a voltage waveform of a detection voltage in the semiconductor module 1. The horizontal axis of a graph illustrated in FIG. 9 represents time, and the vertical axis thereof illustrated in FIG. 9 represents detection voltage.

In the semiconductor module 1, for example, the gate driver circuit 12*y* is set to have an optimal driving capability. In other words, in the semiconductor module 1, the driving capability of the gate driver circuit 12*cy* is set so that the IGBT 111*y* can be optimally driven via the impedance Z_Y of the wiring pattern L_Y when the determination pad Pdy (see FIG. 2) is set to an OPEN state.

Additionally, in the semiconductor module 1, the determination pad Pdx of the gate driver circuit 12*x* connected to the wiring pattern L_X having the impedance Z_X lower than the impedance Z_Y of the wiring pattern L_Y is connected to the power supply terminal from which power supply voltage VCC is output. Furthermore, in the semiconductor module 1, the determination pad Pdz of the gate driver circuit 12*z* connected to the wiring pattern L_Z having the impedance Z_Z higher than the impedance Z_Y of the wiring pattern L_Y is connected to the reference potential terminal (e.g., a ground terminal).

States of connection to the determination pads Pdx, Pdy, and Pdz are set by a user of the semiconductor module 1 on the basis of, for example, a description of specifications before the user of the semiconductor module 1 operates the semiconductor module 1. The determination pads Pdx, Pdy, and Pdz are electrically connected to external terminals of the semiconductor module 1 by bonding wires or the like. The determination pad Pdx and the power supply terminal are connected using a wiring pattern formed on, for example, a printed circuit board mounted with the semiconductor module 1 thereon, an external resistance element, or the like. Similarly, the determination pad Pdz and the reference potential terminal are connected using a wiring pattern formed on the printed circuit board, an external resistance element, or the like.

Thus, in the semiconductor module 1, the driving capabilities of the gate driver circuits 12*x*, 12*y*, and 12*z* are set according to the positional relationships thereof to the IGBTs 111*x*, 111*y*, and 111*z* before starting operation. Then, when power is applied to the semiconductor module 1 and the gate driver circuits 12*x*, 12*y*, and 12*z* are put into operation, the first comparison signal Sc1 at high voltage level and the second comparison signal Sc2 at high voltage level are input to the selection circuit 122*a* provided in the gate driver circuit 12*x*. Therefore, the selection circuit 122*a* provided in the gate driver circuit 12*x* outputs the selection signals Ss1 and Ss2 at low voltage level and the selection signal Ss3 at high voltage level to the first switching unit 122*b* and the second switching unit 124*d* provided in the gate driver circuit 12*x*.

The switches SW2 and SW3 of the switch circuit 122*b*-2 provided in the first switching unit 122*b* of the gate driver circuit 12*x* go into an open state, and the switch SW1 thereof goes into a closed state. This causes the first switching unit 122*b* provided in the gate driver circuit 12*x* to output the switching signal Sch at a maximum voltage level that can be set to the amplifier 123*a* provided in the drive unit 123 of the gate driver circuit 12*x*. Therefore, the transistor 123*c*-1 of the current mirror circuit 123*c* provided in the drive unit 123 of the gate driver circuit 12*x* outputs a minimum current that can be set. As a result, the transistors 123*c*-2 and 123*g* provided in the drive unit 123 of the gate driver circuit 12*x* output the minimum current that can be set as a gate drive current IgX to the gate terminal of the IGBT 111*x*. As illustrated in FIG. 7, the gate drive current IgX beginning to flow to the gate terminal of the IGBT 111*x* at time t1 reaches a current value Itx at time t2.

In addition, the switches SW5 and SW6 of the switch circuit 124*d*-2 provided in the second switching unit 124*d* provided in the protection unit 124 of the gate driver circuit 12*x* go into an open state, and the switch SW4 thereof goes into a closed state. This causes the second switching unit 124*d* provided in the protection unit 124 of the gate driver circuit 12*x* to output the reference voltage Vref at a maximum voltage level that can be set to the comparator 124*a* provided in the protection unit 124 of the gate driver circuit 12*x*.

Additionally, when power is applied to the semiconductor module 1 and the gate driver circuits 12*x*, 12*y*, and 12*z* are put into operation, the first comparison signal Sc1 at high voltage level and the second comparison signal Sc2 at low voltage level are input to the selection circuit 122*a* provided in the gate driver circuit 12*y*. Therefore, the selection circuit 122*a* provided in the gate driver circuit 12*y* outputs the selection signal Ss1 at low voltage level and the selection signals Ss2 and Ss3 at high voltage level to the first switching unit 122*b* and the second switching unit 124*d* provided in the gate driver circuit 12*y*.

The switches SW1 and SW3 of the switch circuit 122*b*-2 provided in the first switching unit 122*b* of the gate driver circuit 12*y* go into an open state, and the switch SW2 thereof goes into a closed state. This causes the first switching unit 122*b* provided in the gate driver circuit 12*y* to output the switching signal Sch at a voltage level between a maximum and a minimum that can be set to the amplifier 123*a* provided in the drive unit 123 of the gate driver circuit 12*y*. Therefore, the transistor 123*c*-1 of the current mirror circuit 123*c* provided in the drive unit 123 of the gate driver circuit 12*y* outputs a current between a maximum and a minimum that can be set. As a result, the transistors 123*c*-2 and 123*g* provided in the drive unit 123 of the gate driver circuit 12*y* output the current between the maximum and the minimum that can be set as a gate drive current IgY to a gate terminal of the IGBT 111*y*. As illustrated in FIG. 7, the gate drive current IgY beginning to flow to the gate terminal of the IGBT 111*y* at time t1 reaches a current value Ity greater than the current value Itx at time t2.

In addition, the switches SW4 and SW6 of the switch circuit 124d-2 provided in the second switching unit 124d provided in the protection unit 124 of the gate driver circuit 12y go into an open state, and the switch SW5 thereof goes into a closed state. This causes the second switching unit 124d provided in the protection unit 124 of the gate driver circuit 12y to output the reference voltage Vref at a voltage level between a maximum and a minimum that can be set (i.e., a voltage level lower than the reference voltage Vref in the gate driver circuit 12x) to the comparator 124a provided in the protection unit 124 of the gate driver circuit 12y.

Additionally, when power is applied to the semiconductor module 1 and the gate driver circuits 12x, 12y, and 12z are put into operation, the first comparison signal Sc1 at high voltage level and the second comparison signal Sc2 at high voltage level are input to the selection circuit 122a provided in the gate driver circuit 12z. Therefore, the selection circuit 122a provided in the gate driver circuit 12z outputs the selection signals Ss1 and Ss2 at low voltage level and the selection signal Ss3 at high voltage level to the first switching unit 122b and the second switching unit 124d provided in the gate driver circuit 12z.

The switches SW1 and SW2 of the switch circuit 122b-2 provided in the first switching unit 122b of the gate driver circuit 12z go into an open state, and the switch SW3 thereof goes into a closed state. This causes the first switching unit 122b provided in the gate driver circuit 12z to output the switching signal Sch at a maximum voltage level that can be set to the amplifier 123a provided in the drive unit 123 of the gate driver circuit 12z. Therefore, the transistor 123c-1 of the current mirror circuit 123c provided in the drive unit 123 of the gate driver circuit 12z outputs a maximum current that can be set. As a result, the transistors 123c-2 and 123g provided in the drive unit 123 of the gate driver circuit 12z output the maximum current that can be set as a gate drive current IgZ to a gate terminal of the IGBT 111z. As illustrated in FIG. 7, the gate drive current IgZ beginning to flow to the gate terminal of the IGBT 111z at time t1 reaches a current value Itz greater than the current values Itx and Ity at time t2.

In addition, the switches SW4 and SW5 of the switch circuit 124d-2 provided in the second switching unit 124d provided in the protection unit 124 of the gate driver circuit 12z go into an open state, and the switch SW6 thereof goes into a closed state. This causes the second switching unit 124d provided in the protection unit 124 of the gate driver circuit 12z to output the reference voltage Vref at a minimum voltage level that can be set (i.e., a voltage level lower than the reference voltage Vref in the gate driver circuit 12y) to the comparator 124a provided in the protection unit 124 of the gate driver circuit 12z.

As illustrated in FIG. 7, the gate drive current IgX output by the gate driver circuit 12x, the gate drive current IgY output by the gate driver circuit 12y, and the gate drive current IgZ output by the gate driver circuit 12z differ in the current value reached at time t2. The current value Itx of the gate drive current IgX is smallest, the current value Ity of the gate drive current IgY is second smallest, and the current value Itz of the gate drive current IgZ is greatest.

However, among the impedances Z_X, Z_Y, and Z_Z of the wiring patterns L_X, L_Y, and L_Z, the impedance Z_X of the wiring pattern L_X through which the gate drive current IgX flows is lowest, the impedance Z_Y of the wiring pattern L_Y through which the gate drive current IgY flows is second lowest, and the impedance Z_Z of the wiring pattern L_Z through which the gate drive current IgZ flows is highest. Thus, among the wiring patterns L_X, L_Y, and L_Z, the wiring pattern L_X has a smallest voltage drop, the wiring pattern L_Y has a second smallest voltage drop, and the wiring pattern L_Z has a largest voltage drop. Therefore, the gate drive current IgX flowing to the gate terminal of the IGBT 111x, the gate drive current IgY flowing to the gate terminal of the IGBT 111y, and the gate drive current IgZ flowing to the gate terminal of the IGBT 111z have substantially the same current amount.

Figure 8:
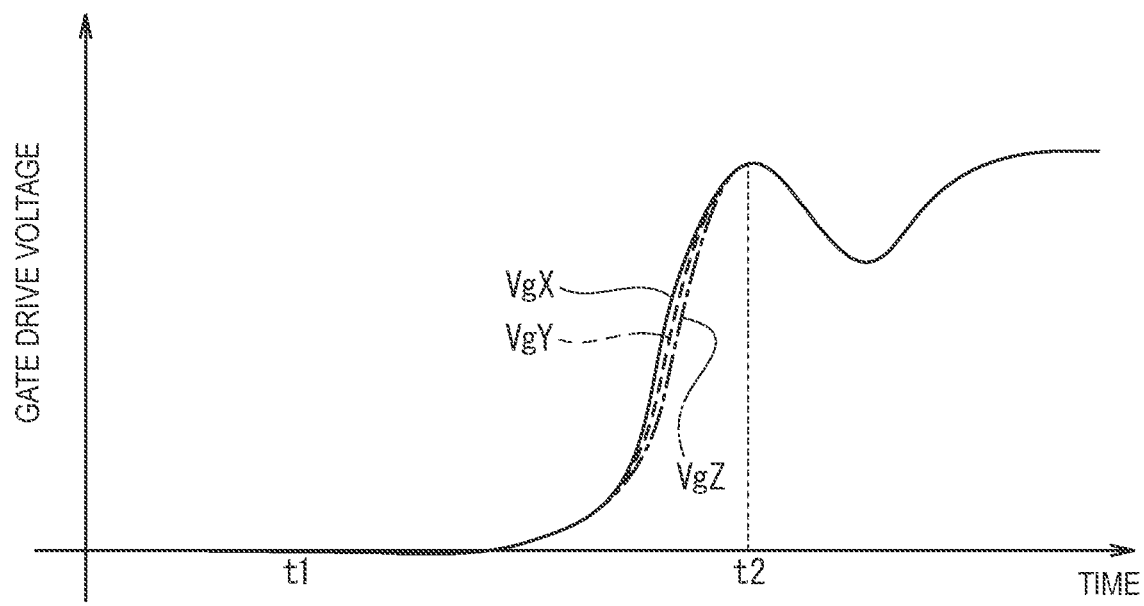
FIG. 8 is a diagram schematically illustrating one example of a voltage waveform of a gate drive voltage in the semiconductor module according to the one embodiment of the present disclosure.

As a result, a gate drive voltage VgX of the IGBT 111x, a gate drive voltage VgY of the IGBT 111y, and a gate drive voltage VgZ of the IGBT 111z have substantially the same voltage waveform, and have substantially the same voltage value at time t2, as illustrated in FIG. 8. Therefore, in the semiconductor module 1, all the gate driver circuits 12x, 12y, and 12z can optimally drive the IGBTs 111x, 111y, and 111z. This enables the semiconductor module 1 to reduce noise occurring during switching operation of the IGBTs 111x, 111y, and 111z (i.e., during turn-on and turn-off) compared with the semiconductor module according to the comparative example. Furthermore, the semiconductor module 1 can reduce switching losses during switching operation of the IGBTs 111x, 111y, and 111z (i.e., during turn-on and turn-off) compared with the semiconductor module according to the comparative example.

Figure 9:
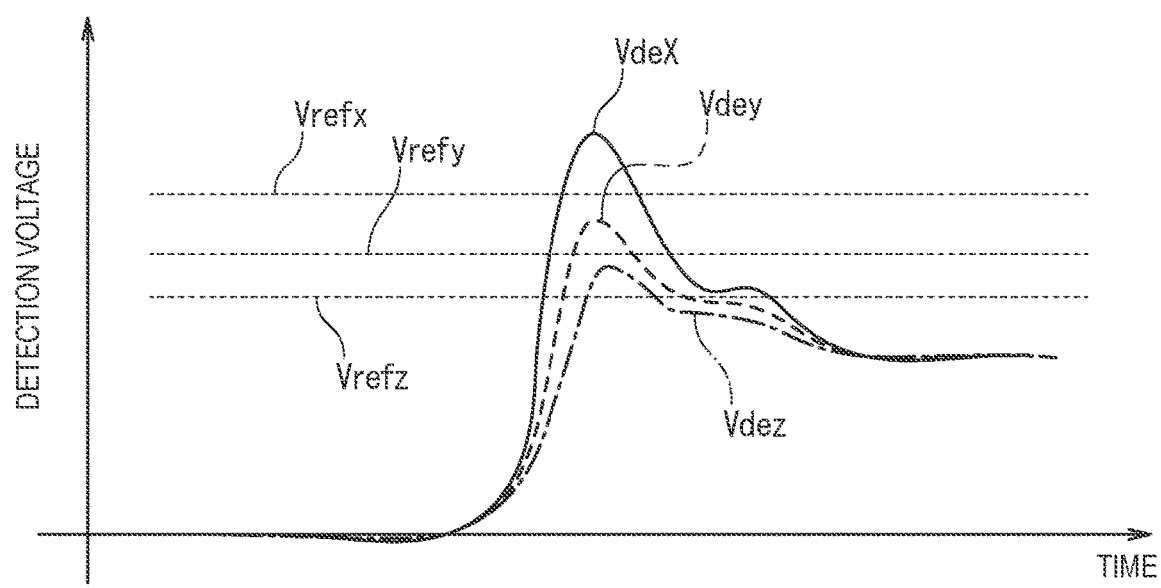
FIG. 9 is a diagram schematically illustrating one example of a voltage waveform of a detection voltage in the semiconductor module according to the one embodiment of the present disclosure.

As illustrated in FIG. 9, a reference voltage Vrefx set by the protection unit 124 provided in the gate driver circuit 12x, a reference voltage Vrefy set by the protection unit 124 provided in the gate driver circuit 12y, and a reference voltage Vrefz set by the protection unit 124 provided in the gate driver circuit 12z have different voltage levels from each other. The voltage level of the reference voltage Vrefx is higher than the voltage level of each of the reference voltages Vrefy and Vrefz, the voltage level of the reference voltage Vrefy is higher than the voltage level of the reference voltage Vrefz, and the voltage level of the reference voltage Vrefz is lowest. Therefore, the semiconductor module 1 can determine the initial transient characteristics of the IGBTs 111x, 111y, and 111z using the dedicated reference voltages Vrefx, Vrefy, and Vrefz. This enables the semiconductor module 1 to improve the accuracy of determination of the initial transient characteristics of the IGBTs 111x, 111y, and 111z compared with the semiconductor module according to the comparative example.

Although a detailed description is omitted, the semiconductor module 1 can also reduce noise and switching losses even in the IGBTs 111u, 111v, and 111w (see FIG. 1). Additionally, the semiconductor module 1 can reduce noise and switching losses during turn-on and turn-off of the IGBTs 111u, 111v, 111w, 111x, 111y, and 111z. Furthermore, the semiconductor module 1 can also improve the accuracy of determination of the initial transient characteristics even in the IGBTs 111u, 111v, and 111w (see FIG. 1).

As described above, the semiconductor module 1 according to the present embodiment includes the IGBTs 111u, 111v, 111w, 111x, 111y, and 111z configured to supply power to a load and the gate driver circuits 12u, 12v, 12w, 12x, 12y, and 12z in which drive targets are set in a one-to-one relationship to the IGBTs 111u, 111v, 111w, 111x, 111y, and 111z and in which a driving capability of the gate driver circuit 12u to drive the IGBT 111u is set according to a positional relationship thereof to the IGBT 111u as the drive target, a driving capability of the gate driver circuit 12v to drive the IGBT 111v is set according to a positional relationship thereof to the IGBT 111v as the drive target, a driving capability of the gate driver circuit 12w to drive the IGBT 111w is set according to a positional relationship thereof to the IGBT 111w as the drive target, a driving capability of the gate driver circuit 12*x* to drive the IGBT 111*x* is set according to a positional relationship thereof to the IGBT 111*x* as the drive target, a driving capability of the gate driver circuit 12*y* to drive the IGBT 111*y* is set according to a positional relationship thereof to the IGBT 111*y* as the drive target, and a driving capability of the gate driver circuit 12*z* to drive the IGBT 111*z* is set according to a positional relationship thereof to the IGBT 111*z* as the drive target.

With the above configuration, the semiconductor module 1 can reduce variation in drive characteristics (e.g., timing for turning on and off) of each of the IGBTs 111*u*, 111*v*, 111*w*, 111*x*, 111*y*, and 111*z*. As a result, the semiconductor module 1 can reduce switching losses during switching operation (i.e., during turn-on and turn-off) of the IGBTs 111*u*, 111*v*, 111*w*, 111*x*, 111*y*, and 111*z*.

The technological scope of the present disclosure is not limited to the illustrated and described exemplary embodiments, and includes all embodiments that provide advantageous effects equivalent to those intended by the present disclosure. Additionally, the technological scope of the present disclosure is not limited to combinations of features of the present disclosure defined by the claims, and may be defined by any desired combination of specific features out of all disclosed respective features.

REFERENCE SIGNS LIST

1: Semiconductor module
3: Controller
4: AC power supply unit
5: Smoothing capacitor
6: Motor
10: Semiconductor substrate
11*u*, 11*v*, 11*w*, 11*x*, 11*y*, 11*z*: Semiconductor element
12*cx*, 12*cy*, 12*cz*, 12*u*, 12*v*, 12*w*, 12*x*, 12*y*, 12*z*: Gate driver circuit
111*cx*, 111*cy*, 111*cz*, 111*u*, 111*v*, 111*w*, 111*x*, 111*y*, 111*z*: IGBT
112*u*, 112*v*, 112*w*, 112*x*, 112*y*, 112*z*: Reflux diode
121: Determination unit
121*a*: Discrimination unit
121*a*-1: First comparator
121*a*-2: First comparison voltage generation unit
121*a*-3: Second comparator
121*a*-4: Second comparison voltage generation unit
122: Setting unit
122*a*: Selection circuit
122*b*: First switching unit
122*b*-1, 124*d*-1: Ladder resistance circuit
122*b*-2, 124*d*-2: Switch circuit
123: Drive unit
123*a*: Amplifier
123*b*, 123*c*-1, 123*c*-2, 123*e*, 123*f*, 123*g*: Transistor
123*c*: Current mirror circuit
123*d*, 124*b*-1, R1, R2, R3, R4, R5, R6, R7, R8, R9, R10: Resistance element
124: Protection unit
124*a*: Comparator
124*b*: Conversion unit
124*c*: Processing unit
124*d*: Second switching unit
cL_X, cL_Y, cL_Z, L_IU, L_IV, L_IW, L_IX, L_IY, L_IZ, L_N, L_OU, L_OV, L_OW, L_P, L_U, L_V, L_W, L_X, L_Y, L_Z: Wiring pattern
IgcX, IgcY, IgcZ, IgX, IgY, IgZ: Gate drive current
InU, InV, InW, InX, InY, InZ: Input signal
Is: Detection current
Ln: Negative-side line
Lp: Positive-side line
P_N: Negative power supply input pad
P_P: Positive power supply input pad
P_U: U-phase output pad
P_V: V-phase output pad
P_W: W-phase output pad
Pdu, Pdv, Pdw, Pdx, Pdy, Pdz: Determination pad
Pgnd: Reference potential pad
PinU, PinV, PinW, PinX, PinY, PinZ: Signal input pad
Pvcc: Power supply pad
S: Current detection element
Sc: Comparison signal
Sc1: First comparison signal
Sc2: Second comparison signal
Sch: Switching signal
SgU, SgV, SgW, SgX, SgY, SgZ: Gate drive signal
So: Output signal
Ss1, Ss2, Ss3: Selection signal
SW1, SW2, SW3, SW4, SW5, SW6: Switch
TinU, TinV, TinW, TinX, TinY, TinZ: Signal input terminal
Tn: Negative power supply input terminal
Tp: Positive power supply input terminal
TU: U-phase output terminal
TV: V-phase output terminal
TW: W-phase output terminal
Vc1: First comparison voltage
Vc2: Second comparison voltage
VCC: Power supply voltage
Vde: Determination voltage
VdecX, VdecY, VdecZ: Detection voltage
VgcX, VgcY, VgcZ, VgX, VgY, VgZ: Gate drive voltage
Vref, Vrefc, Vrefx, Vref y, Vrefz: Reference voltage
Vs: Detection voltage
Z_NX, Z_NY, Z_NZ, Z_PU, Z_PV, Z_PW, Z_U, Z_V, Z_W, Z_X, Z_Y, Z_Z: Impedance

The invention claimed is:

1. A semiconductor module comprising:
a plurality of semiconductor switching elements configured to supply power to a load; and
a plurality of driver circuits in which drive targets are set in a one-to-one relationship to the plurality of semiconductor switching elements and in which according to a positional relationship to each of target switching elements that are the semiconductor switching elements as the drive targets, a driving capability to drive the each target switching element is set, wherein each of the plurality of driver circuits includes a protection unit configured to protect the each target switching element of the driver circuit, wherein the protection unit of the each of the plurality of driver circuits is configured to protect the each target switching element of the driver circuit on a basis of a threshold value set according to the positional relationship of the driver circuit including the protection unit itself.

2. The semiconductor module according to claim 1, wherein each of the plurality of driver circuits includes a determination unit configured to determine the positional relationship to the each target switching element.

3. The semiconductor module according to claim 2, wherein each of the plurality of driver circuits includes a setting unit configured to set the driving capability on a basis of a determination result of the determination unit.

4. The semiconductor module according to claim 3, wherein each of the plurality of driver circuits includes a drive unit configured to drive the each target switching element with the driving capability set by the setting unit.

5. The semiconductor module according to claim 4, wherein the determination unit includes a pad with a voltage level changed according to the positional relationship and a discrimination unit configured to discriminate the voltage level of the pad.

6. The semiconductor module according to claim 5, wherein the setting unit includes a selector configured to generate a selection signal for selecting a driving capability of the drive unit on a basis of a discrimination result of the discrimination unit and a first switching unit configured to switch the driving capability of the drive unit on a basis of the selection signal.

7. The semiconductor module according to claim 6, wherein each of the plurality of semiconductor switching elements includes a current detection element for detecting current flowing through the each semiconductor switching element itself, and the protection unit includes a conversion unit configured to convert a detection current detected by the current detection element to a detection voltage, a second switching unit configured to switch a reference voltage as the threshold value according to the positional relationship of the driver circuit including the second switching unit itself, a comparator configured to compare the detection voltage with the reference voltage, and a processing unit configured to determine whether or not to protect the each target switching element on a basis of a comparison result of the comparator and configured to execute protection processing when protection of the each target switching element is determined.

8. The semiconductor module according to claim 7, wherein the second switching unit uses the selection signal to determine the positional relationship.

* * * * *